(12) United States Patent
Nakajo

(10) Patent No.: US 6,781,937 B2
(45) Date of Patent: *Aug. 24, 2004

(54) OPTICAL DISK RECORDING METHOD AND DEVICE

(75) Inventor: Yukihisa Nakajo, Hamamatsu (JP)

(73) Assignee: Yamaha Corporation, Hamamatsu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/233,826

(22) Filed: Jan. 20, 1999

(65) Prior Publication Data

US 2002/0089914 A1 Jul. 11, 2002

(30) Foreign Application Priority Data

Jan. 21, 1998 (JP) .......................... 10-023969
Jul. 14, 1998 (JP) .......................... 10-213464

(51) Int. Cl.[7] ............................... G11B 7/00
(52) U.S. Cl. ....................... 369/59.12; 369/116
(58) Field of Search ...................... 369/116, 59, 13, 369/54, 59.11, 59.12, 47.17, 47.19, 47.5, 53.23, 53.27

(56) References Cited

U.S. PATENT DOCUMENTS

| | | | |
|---|---|---|---|
| 4,894,816 A | | 1/1990 | Sukeda et al. |
| 5,297,129 A | | 3/1994 | Wilkinson et al. |
| 5,396,480 A | * | 3/1995 | Morishita et al. .............. 369/13 |
| 5,418,770 A | * | 5/1995 | Ide et al. ..................... 369/116 |
| 5,502,702 A | | 3/1996 | Nakajo |
| 5,581,535 A | | 12/1996 | Saito et al. |
| RE35,435 E | * | 1/1997 | Saito et al. .................... 369/59 |
| 5,663,941 A | * | 9/1997 | Aoshima ....................... 369/116 |
| 5,732,062 A | * | 3/1998 | Yokoi et al. ................... 369/116 |
| 5,825,742 A | * | 10/1998 | Tanaka et al. .................. 369/59 |
| 5,848,045 A | * | 12/1998 | Kirino et al. .................. 369/116 |
| 6,018,508 A | * | 1/2000 | Hasegawa ...................... 369/116 |
| 6,226,243 B1 | * | 5/2001 | Kobayashi et al. ............ 369/47.14 |

FOREIGN PATENT DOCUMENTS

| | | |
|---|---|---|
| EP | 0289260 | 11/1988 |
| EP | 0477892 | 4/1992 |
| EP | 0820053 | 1/1998 |
| JP | 64-078437 | 3/1989 |
| JP | 06-162507 | 6/1994 |
| JP | 06-295440 | 10/1994 |
| JP | 6314429 | 11/1994 |
| JP | 07-129960 | 5/1995 |
| JP | 07225947 | 8/1995 |
| JP | 7-225948 | 8/1995 |
| JP | 8055340 | 2/1996 |
| JP | 08-124163 | 5/1996 |
| JP | 1031825 | 2/1998 |
| JP | 10-64065 | 3/1998 |

* cited by examiner

Primary Examiner—Thang V. Tran
(74) Attorney, Agent, or Firm—Pillsbury Winthrop LLP

(57) ABSTRACT

A top-power-increasing additional pulse is imparted to a portion of top power irradiation of a laser light beam, and a bottom-power-off pulse is imparted to a portion of bottom power irradiation of the laser light beam. Fine adjustment amount for the top power irradiation is modified roughly in accordance with a desired length of a pit to be formed, and the duration of the top-power-increasing additional pulse is adjusted finely. Fine adjustment amount for the bottom power irradiation is modified roughly in accordance with a desired length of a land to be formed, and the duration of the bottom-power-off pulse is adjusted finely. Further, timing to start the top power irradiation of the laser light beam is modified according to a desired length of a pit to be next formed; that is, the greater the next pit length, the more is delayed the top power irradiation start timing. In addition, timing to end the top power irradiation of the laser light beam is modified according to a desired length of a land to be next formed; that is, the greater the next land length, the more is advanced the top power irradiation end timing.

18 Claims, 11 Drawing Sheets

OPTICAL DISK RECORDING METHOD AND DEVICE

BACKGROUND OF THE INVENTION

The present invention relates generally to methods and devices for optical disk recording based on a mark-length recording scheme, which irradiate a laser light beam onto a recording surface of an optical disk to form pits and lands therein representing desired information. More particularly, the present invention relates to an optical disk recording device and method which achieve improved quality or characteristics of recording signals, such as reduced jitter and deviation and a lower error Irate, when information is recorded at a higher speed than a normal (or one-time) speed or when information is recorded at high density.

The CD-WO (Compact Disk-Write Once) standard, sometimes called an "orange book standard", is among various known schemes for recording on writable optical disks. According to the CD-WO standard, desired information is recorded in combinations of pits and lands (i.e., portions between the pits) using a "3T–11T" format: "1T" represents a time length of 231.3 ns. (=1/4.3218 MHz) in a normal-speed (one-time-speed) recording mode, ½ of the normal-speed time length in a double-speed recording mode, ¼ of the normal-speed time length in a quadruple-speed recording mode, ⅙ of the normal-speed time length in a six-times-speed recording mode. As shown in FIG. 2, a laser light beam to be used for recording on a CD-WO (or CD-R) disk is set to a top or recording power level or value, i.e., a high level capable of recording information, for each pit-forming section and set to a bottom or reproducing power value, i,e, a low capable of reproducing information but incapable of recording information, for each land-forming section. If, in this case, the laser light beam continues to be held at the top power level over a time period corresponding exactly to a desired length of a pit, the actual length of the formed pit undesirably tends to be longer than the desired length by about 1T due to residual heat of the laser light. To avoid this inconvenience, there has been employed a laser power modulation called a "(n–K)T+α(nT)" recording strategy, in accordance with which the duration of each top power irradiation, intended for formation of a pit, is made shorter than a desired length nT of a pit to be formed by about a length of K×T (K is a constant). Here, "α(nT)" represents an amount of fine adjustment per pit length which is to be added to each pit-forming top power irradiation period to delay termination of the top power irradiation, and is set in accordance with the following relationship:

$$\alpha(3T) \geq \alpha(4T) \geq \alpha(5T), \ldots, \geq \alpha(11T)$$

$$(\alpha(3T) > \alpha(11T))$$

As another example of the laser power modulation, there has been proposed a "(n–K)T+α(nT)–β(mT)" recording strategy, where the duration of each top power irradiation is modified in accordance with a desired length nT of a pit to be formed and a length of a preceding land. Here, "K" is a constant. "α(nT)" represents an amount of fine adjustment per pit length which is to be added to the end of each top power irradiation period to delay termination of the top power irradiation, and at least $$\alpha(3T) \geq \alpha(4T) \geq \alpha(5T), \ldots, \geq \alpha(8T)$$

$$(\alpha(3T) > \alpha(8T))$$

Further, "β(mT)" represents an amount of fine adjustment for each preceding land's length which is to be added to the beginning of each top power irradiation period to delay a start of the top power irradiation, and at least $$\beta(3T) \geq \beta(4T) \geq \beta(5T), \ldots, \geq \beta(8T)$$

$$(\beta(3T) > \beta(8T))$$

Furthermore, the assignee of the present application has proposed another form of recording power modulation in Japanese Patent Application No. HEI-8-233596, in accordance with which the top power level or value is increased by 1 mW for a 5T period at the beginning of each pit-forming top power irradiation period, as shown in FIG. 3, to thereby minimize unwanted jitter and pit deviation (i.e., deviation from predetermined or accurate pit lengths).

Time resolution (i.e., smallest time-variable amount) of the above-mentioned fine adjustment amounts α(nT) and β(mT) depends on an oscillation frequency of a crystal oscillator employed. For example, where a crystal oscillator of a 33.8 MHz oscillation frequency is used to generate 276-MHz clock pulses through electric circuit processing of "33.8×4×(98/96)×2", there is achieved a time resolution of 1/276 MHz=3.6 ns. Such time resolution may be sufficient at low recording speeds; however, as the recording speed is increased, the length of 1T becomes smaller and hence the ratio of the time resolution relative to the 1T time length becomes considerably greater. Thus, in the prior art, it was not possible to set the fine adjustment amounts α(nT) and β(mT) such that the jitter, deviation and error rate fall within permissible ranges.

For instance, when recording is effected in the six-times-speed recording mode, the time length of 1T is 38.55 ns. (231.3 ns./6), and the 3.6 ns. time resolution amounts to 3.6/38.55=0.09 T; that is, the fine adjustment amounts α(nT) and β(mT) in this case can be set in steps of 0.09T. FIGS. 4 and 5 show measurements of jitter in a 3T land and deviation of a 3T pit when recording was effected with this time resolution, on an optical disk containing phthalocyanine and made by a certain manufacturer, in the six-times-speed recording mode using the laser power modulation of FIG. 3 with a basic strategy of "(n–0.2)T+(n)–0.09T". In FIGS. 4 and 5, curve A represents a characteristic when α(3T) was set to "0", curve B represents a characteristic when α(3T) was set to "0.09T" and curve C represents a characteristic when α(3T) was set to "0.19T". Horizontal axis β(%) represents a standardized parameter for asymmetry of reproduced waveform which is different from the fine adjustment amount β(mT).

It is required that the jitter of the 3T land be 35 or less in a 0–8% range of the parameter β(%) and the deviation of the 3T pit be 40 or less in the 0–8% range of the parameter β(%). In the example of FIG. 4, the 3T-land's jitter condition was optimized when α(3T) was "0.19T" (curve C); however, in the example of FIG. 5, the 3T-pit's deviation exceeded the upper allowable limit of 40. Further, when α(3T) was "0.09T" (curve B), the 3T-pit's deviation fell within the permissible range but the the 3T-land's jitter proved considerably less favorable than when α(3T) was "0.19T" (curve C).

With the prior art, it was not possible to set the fine adjustment amounts α(nT) and β(mT) that optimize the jitter, deviation, error rate, etc., because the time resolution of the adjustment amounts α(nT) and β(mT) would become lower as the recording speed is raised, as stated above. The fine adjustment amounts α(nT) and β(mT) may be set to optimum values by raising the oscillation frequency of the crystal oscillator to thereby provide higher time resolution; however, raising the oscillation frequency of the crystal oscillator would undesirably lead to a higher cost of the device.

The adjustment amounts $\alpha(nT)$ and $\beta(mT)$ in the aforementioned "$(n-K)T+\alpha(nT)$" and "$(n-K)T+\alpha(nT)-\beta(mT)$" recording strategies are intended to achieve improved quality of recording signals, such as less jitter, by canceling errors that would be caused, at the beginning or fore end of the pits (i.e., the rear end of the lands) and at the rear end of the pits (i.e., the beginning of the lands), due to a difference in the amount of heat flowing from a preceding recorded portion. However, modulation by the adjustment amounts $\alpha(nT)$ and $\beta(mT)$ alone could not provide a sufficiently improved quality of recording signals; rather, the recording signal quality would be deteriorated as the pits and lands are made smaller in length such as in high-density recording.

SUMMARY OF THE INVENTION

It is therefore an object of the present invention to provide an optical disk recording device which achieves improved quality, such as less jitter and deviation and a lower error rate, of recording signals in high-speed recording, without having to raise time resolution of fine adjustment amounts employed for laser power modulation.

It is another object of the present invention to provide an optical recording method which achieves improved quality of recording signals.

According to an aspect of the present invention, there is provided an optical disk recording device for forming pits and lands based on a mark-length recording scheme by irradiating a laser light beam onto a recording surface of an optical disk, the laser light beam being set to a top power value capable of forming a pit for each pit-forming section and set to a bottom power value incapable of forming a pit for each land-forming section between the pit-forming sections, which comprises a control unit that, in recording at a speed higher than a normal speed, performs: control to cause end timing of a top power irradiation period of the laser light beam to differ from predetermined end timing of a pit to be formed by a specific amount depending on a desired length of the pit or to cause start timing of the top power irradiation period of the laser light beam to differ from predetermined end timing of a land to be formed by a specific amount depending on a desired length of the land; and control to form and impart a top-power-increasing additional pulse to a portion of the top power irradiation period to temporarily increase a value of the top power value by an amount smaller than a difference between the top power value and the bottom power value and also to vary a time length of the additional pulse in accordance with the desired length of the pit, and/or, control to form and impart a bottom-power-off pulse to a portion of each land-forming bottom power irradiation period of the laser light beam to temporarily decrease a value of the bottom power value by an amount smaller than a difference between the top power value and the bottom power value and also to vary a time length of the bottom-power-off pulse in accordance with the desired length of the land.

Making longer the duration of the top-power-increasing additional pulse increases the energy to be applied for forming a pit, so that the pit would be formed with its rear end expanded or located farther from its leading or fore end. Conversely, making shorter the duration of the top-power-increasing additional pulse decreases the necessary energy for forming a pit, so that the pit would be formed with its rear end contracted or located closer to its fore end. If the power increase of the top-power-increasing additional pulse over the remaining portion of the top power irradiation period is smaller than the difference between the top power level and the bottom power level, the energy value of the top-power-increasing additional pulse per time resolution can be smaller than the energy value of the top power per time resolution (i.e., energy value for the fine adjustment amount $\alpha(nT)$ per time resolution). Thus, even where the top-power-increasing additional pulse and the fine adjustment amount $\alpha(nT)$ are of the same time resolution, the amount of energy to be applied can be adjusted more finely by controlling the duration of the top-power-increasing additional pulse rather than controlling the adjustment amount $\alpha(nT)$, which allows the location of the pit's rear end to be adjusted finely. As a consequence, the pit's rear end can be formed at an accurate location by first roughly adjusting the fine adjustment amount $\alpha(nT)$ for the overall duration of the top power irradiation period and then further adjusting the duration of the top-power-increasing additional pulse.

Making longer the duration of the bottom-power-off pulse decreases the energy to be applied for forming a land, so that the land would be formed with its rear end (i.e., the fore end of a following pit) expanded rearward, i.e., located farther from its fore end. Conversely, making shorter the duration of the bottom-power-off pulse decreases the energy to be applied for forming a land, so that the land would be formed with its rear end contracted forward, i.e., located closer to its fore end. If the power decrease of the bottom-power-off pulse over the remaining portion of the bottom power irradiation period is smaller than the difference between the top power level and the bottom power level, the energy value of the bottom-power-off pulse per time resolution can be smaller than the energy value of the bottom power per time resolution (i.e., energy value for the fine adjustment amount $\beta(mT)$ per time resolution). Thus, even where the bottom-power-off pulse and the fine adjustment amount $\beta(mT)$ are of the same time resolution, the amount of energy to be applied can be adjusted more finely by controlling the duration of the bottom-power-off pulse rather than controlling the adjustment amount $\beta(mT)$, which allows the location of the land's rear end to be adjusted finely. As a consequence, the land's rear end can be formed at an accurate location by first roughly adjusting the fine adjustment amount $\beta(mT)$ for the overall duration of the bottom power irradiation period and then further adjusting the duration of the bottom-power-off pulse.

By thus adjusting the duration of the top-power-increasing additional pulse and/or bottom-power-off pulse, it is possible to improve various characteristics of recording signals, such as jitter, deviation, error rate, etc. Although the present invention may be arranged to perform, in addition to the above-mentioned control, control to vary the increase of the top-power-increasing additional pulse according to the length of each pit to be formed or the decrease of the bottom-power-off pulse according to the length of each land to be formed, the increase of the top-power-increasing additional pulse can be made the same for every pit or the decrease of the bottom-power-off pulse can be made the same for every land, in which case it is no longer necessary to variably control the power increase or decrease and there remains only the need to control the duration of the top-power-increasing additional pulse or bottom-power-off pulse. This alternative arrangement can facilitate the necessary control as a whole.

Although the top-power-increasing additional pulse may be imparted to any desired portion of the top power irradiation period, it will be more advantageous if the additional pulse is imparted to the beginning of the top power irradiation period because the necessary timing control is significantly facilitated as compared to a situation where the additional pulse is imparted to some intermediate or mid point of the irradiation period. In addition, because the intensity of the top power irradiation tends to be greater at its beginning than at its end, imparting the additional pulse to the beginning of the top power irradiation period allows the fore end of a pit to be formed at a more accurate location than imparting the additional pulse to the end of the irradiation period and also prevents the pit's rear end from being excessively expanded in width. Similarly, although the bottom-power-off pulse may be imparted to any desired portion of the bottom power irradiation period, it will be more advantageous if the off pulse is imparted to the beginning of the bottom power irradiation period because the necessary timing control is significantly facilitated as compared to a situation where the off pulse is imparted to some intermediate point of the irradiation period. In addition, imparting the off pulse to the beginning of the bottom power irradiation period allows the rear end of a land to be formed at a more accurate location than imparting the off pulse to the end of the irradiation period, because the power intensity drops suddenly after termination of the top power irradiation. It will also be appreciated that the top-power-increasing additional pulse may be applied only for some of various pit lengths rather than for every such pit length and the bottom-power-off pulse may be applied only for some of various land lengths rather than for every such land length.

Experiment carried out by the inventor has discovered that influences of laser light heat, on a particular pit, not only from the front but also from the rear (i.e., a portion recorded after the particular pit) tend to cause positional errors in the fore and rear ends of the pit when formed by the laser light beam and lead to poor signal quality such as a less favorable jitter characteristic.

In view of the foregoing, the present invention is characterized primarily by modifying the timing to start top-power or recording-power irradiation of the laser light beam for initiating formation of a pit (i.e., "recording-power irradiation start timing") in accordance with the length of the pit to be formed, or the timing to end recording-power irradiation of the laser light beam for initiating formation of a land (i.e., "recording-power irradiation end timing") in accordance with the length of the land to be formed.

Namely, according an aspect of the present invention, there is provided an optical disk recording method which comprises a step of modifying recording-power irradiation start timing of a laser light beam, to start formation of a pit, according to a length of the pit, which is characterized by, when a pit of a relatively great length is to be formed, delaying the recording-power irradiation start timing as compared to when a pit of a smaller length is to be formed, as long as respective lands immediately preceding the pit of a relatively great length and the pit of a smaller length have a substantially same length. As known in the art, more laser light heat tends to accumulate in the optical disk as the length of a pit to be formed becomes greater, which would result in the pit's fore end being undesirably expanded forward. In the present invention, however, the arrangement of delaying the recording-power irradiation start timing for formation of a relatively long pit as compared to formation of a shorter pit can cancel the tendency of heat accumulation. Thus, the present invention allows the fore end of the pit to be formed accurately at a predetermined position and can significantly reduce unwanted jitter and deviation, thereby achieving enhanced quality of recording signals.

The present invention also provides an optical disk recording method which comprises a step of modifying recording-power irradiation end timing of the laser light beam, to start formation of a land, according to a length of the land, which is characterized by, when a land of a relatively small length is to be formed, advancing the recording-power irradiation end timing as compared to when a land of a greater length is to be formed, as long as respective pits immediately preceding the land of a relatively great length and the land of a smaller length have a substantially same length. When a land of a relatively small length is formed, the heat of the laser light beam used for forming a next pit tends to transfer via the land to a preceding pit, which would result in the preceding pit's rear end being undesirably expanded rearward away from its fore end. In the present invention, however, the arrangement of advancing the recording-power irradiation end timing for formation of a relatively short land as compared to formation of a longer land can cancel the tendency of forward heat transfer. Thus, the present invention allows the rear end of the land to be formed accurately at a predetermined position and can significantly reduce unwanted jitter and deviation, thereby achieving enhanced quality of recording signals.

Generally, of all pits or lands of 3T–11T lengths recorded in a given optical disk in accordance with the CD-WO standard or the like, 4T pits or lands account for about 30%, pits or lands shorter than 4T account for about 36%, and pits or lands longer than 4T account for about 34%. Thus, in a preferred implementation of the present invention, the recording-power irradiation start timing for formation of a pit or land of the 4T length is set to predetermined reference timing with no modification, the recording-power irradiation start or end timing for formation of a pit or land shorter than the 4T length is advanced ahead of the reference timing, and the recording-power irradiation start timing for formation of a pit or land longer than the 4T length is delayed behind the reference timing. With this arrangement, necessary modification amounts for the recording-power irradiation start and end timing can be minimized to a near-zero value, so that it is possible to prevent d.c. components in reproduced signals from being increased due to the timing modification. More specifically, when a pit or land of the 3T length is to be formed, the recording-power irradiation start or end timing may be advanced ahead of the reference timing by an amount ranging from 0 to 12% of the 1T length, and when a pit or land of a length between 5T and 11T is to be formed, the recording-power irradiation start or end timing may be delayed behind the reference timing by an amount ranging from 0 to 6% of the 1T length.

According to another aspect of the present invention, there is also provided an optical disk recording method comprising: a step of modifying recording-power irradiation start timing of a laser light beam, to start formation of a pit, according to a combination of lengths of a pit to be formed and a land immediately preceding the pit; and a step of modifying recording-power irradiation end timing of the laser light beam, to start formation of a land, according to a combination of lengths of a land to be formed and a pit immediately preceding the land. The above-mentioned step of modifying recording-power irradiation start timing of the laser light beam includes a step of, when a pit of a relatively great length is to be formed, delaying the recording-power irradiation start timing as compared to when a pit of a smaller length is to be formed as long as respective lands immediately preceding the pit of a relatively great length and the pit of a smaller length have a substantially same length and also, when a land of a relatively small length is to be formed, delaying the recording-power irradiation start timing as compared to when a land of a greater length is to be formed. The above-mentioned step of modifying recording-power irradiation end timing of the laser light beam including a step of, when a land of a relatively small length is to be formed, advancing the recording-power irradiation end timing as compared to when a land of a greater length is to be formed as long as respective pits immediately preceding the land of a relatively small length and the land of a greater length have a substantially same length and also, when a pit of a relatively great length is to be formed, advancing the recording-power irradiation end timing as compared to when a pit of a smaller length is to be formed.

With the arrangement that the timing modification is performed according to a combination of lengths of a pit to be formed and a land immediately preceding the pit and a combination of lengths of a land to be formed and a pit immediately preceding the land, the pit's fore and rear ends can be formed more accurately at their respective predetermined, and unwanted jitter and deviation can be significantly reduced, which thereby achieves enhanced quality of recording signals.

According to still another aspect of the present invention, there is also provided an optical disk recording device comprising: a storage unit that stores various modification amounts for recording-power irradiation start timing of the laser light beam, to start formation of a pit, corresponding to various combinations of lengths of a pit to be formed and a land immediately preceding the pit, and various modification amounts for recording-power irradiation end timing of the laser light beam, to start formation of a land, corresponding to various combinations of lengths of a land to be formed and a pit immediately preceding the land; and a control unit that detects, from an input recording signal, combinations of lengths of a pit and a land immediately preceding the pit and lengths of a land and a pit immediately preceding the land, reads out from the storage unit one of the modification amounts for recording-power irradiation start timing or the modification amounts for recording-power irradiation end timing which corresponds to one of the detected combinations, and modifies the recording-power irradiation start timing or the recording-power irradiation end timing relative to predetermined reference timing by an amount corresponding to the read-out modification amount.

One of the modification amounts for recording-power irradiation start timing or the modification amounts for recording-power irradiation end timing, corresponding to one of the detected combinations of pit and land lengths, is read out from the storage unit. With this arrangement, both the recording-power irradiation start timing and the recording-power irradiation end timing can be modified, during recording, without involving complicated arithmetic operations for determining a appropriate modification amounts, which thus permits appropriate high-speed recording.

BRIEF DESCRIPTION OF THE DRAWINGS

For better understanding of the above and other features of the present invention, preferred embodiments of the invention will hereinafter be described in greater detail with reference to the accompanying drawings, in which.

DETAILED DESCRIPTION OF THE PREFERRED EMBODIMENTS

Figure 6:
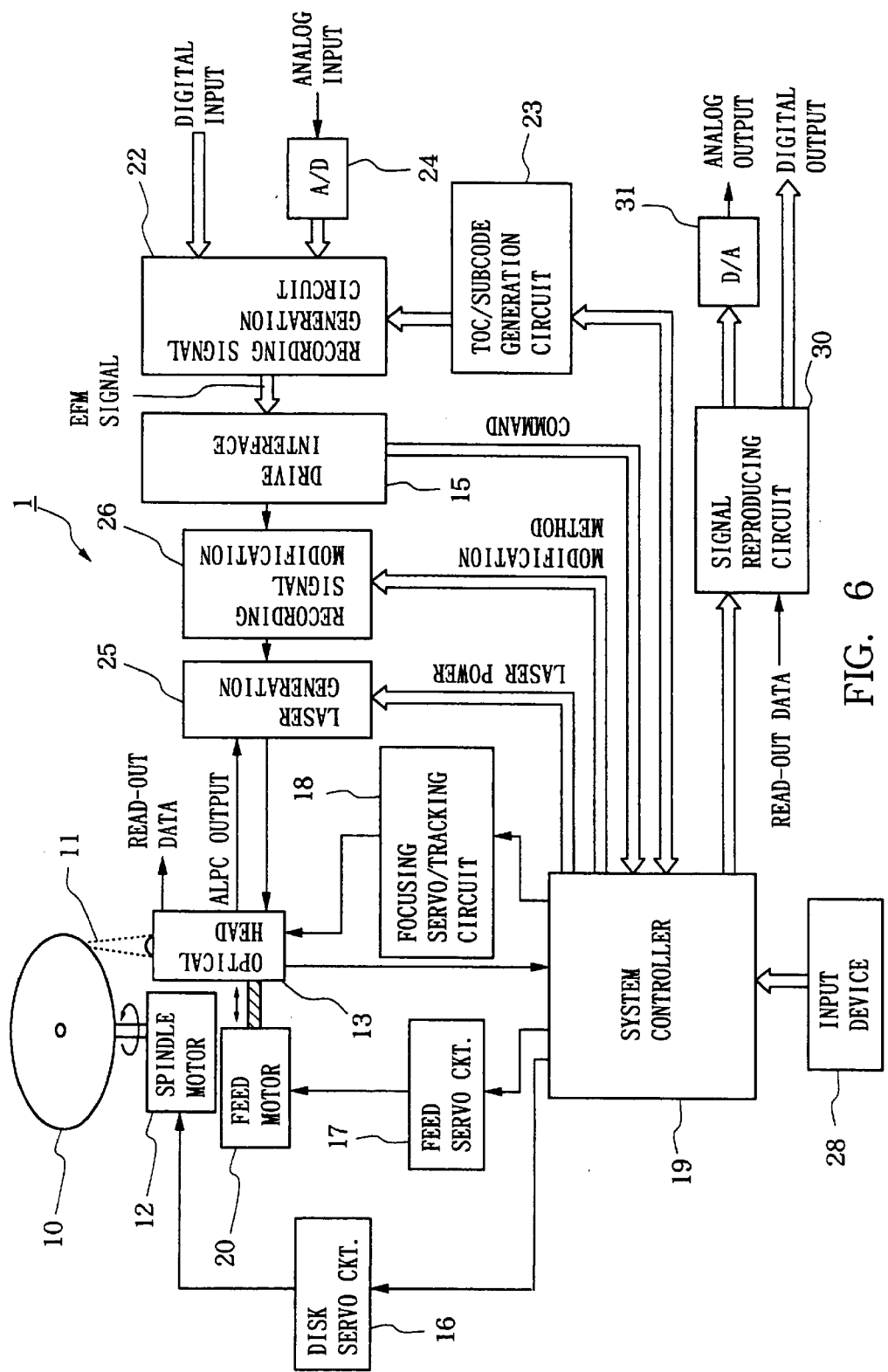
FIG. 6 is a block diagram showing a general hardware setup of an optical disk recording/reproducing device of to which the present invention is applied.

Referring first to FIG. 6, there is shown a general hardware setup of an optical disk recording/reproducing device 1 to which the present invention is applied. In FIG. 6, an input device 28 sets a recording speed in response to selection by a human operator. In response to an instruction from a system controller 19, a disk servo circuit 16 controls a spindle motor 12 to rotate at a constant linear velocity at the recording speed set via the input device 28. Specifically, the spindle motor 12 is controlled by the disk servo circuit 16 so that it rotates at a linear velocity of 1.2–1.4 m/s in the normal (one-time) speed recording mode, two times as fast as the normal-speed linear velocity in the double-speed recording mode, four times as fast in the quadruple-speed recording mode, six time as fast in the six-times-speed recording mode, and so on. Because the CD-WO standard prescribes that the wobble in the pre-grooves of an optical disk 10 be of a frequency of 22.05 kHz, such control for constant linear velocity can be accomplished by detecting the wobble from output signals of an optical head 13 (alternatively, the wobble may be detected from residual components of a tracking error signal) and then controlling the spindle motor 12 in a phase-locked-loop (PLL) fashion so that the wobble frequency falls within a predetermined frequency, e.g., 22.05 kHz in the normal speed recording mode, 44.1 kHz in the double-speed recording mode, or 88.2 kHz in the quadruple-speed recording mode.

Focusing and tracking servo circuit 18 performs focusing and tracking control of laser light emitted from a semiconductor laser provided within the optical head 13, in accordance with an instruction from the system controller 19. The tracking control is effected by detecting the pre-grooves formed in the optical disk 10. Feed servo circuit 17 drives a feed motor 20 to move the optical head 13 in the radial direction of the optical disk 13, in accordance with an instruction from the system controller 19.

At a velocity corresponding to the user-selected recording speed, each input signal to be recorded on the optical disk (CD-WO disk) 10 is fed to a recording-signal generating circuit 22 directly if the input signal is in digital form or by way of an A/D converter 24 if the input signal is an analog signal such as an audio signal. The recording-signal generating circuit 22 has the input data interleaved and adds, to the input data, error check codes as well as TOC (Table-Of-Contents) and subcode information generated by a TOC/subcode generating circuit 23. Then, the recording-signal generating circuit 22 EFM-modulates the data to generate serial data in a CD-standard format and at a transfer rate corresponding to the selected recording speed and outputs the thus-generated serial data as a recording signal.

The recording signal from the generating circuit 22 is sent via a drive interface 15 to a recording-signal modifying circuit 26, where it is subjected to modulation based on a laser power modulating strategy selected on the basis of various characteristics of the optical disk employed, such as a manufacturer of the disk and coloring material used in the disk, linear velocity, selected recording speed and the like. The thus-modulated recording signal is passed to a laser light generating circuit 25, which drives the semiconductor laser in the optical head 13 in accordance with the recording signal so that a laser light beam is irradiated onto a recording surface of the optical disk 10 to form pits for recording of desired information. At that time, a predetermined power value, corresponding to the selected recording speed and, if necessary, to the linear velocity as well, is designated for the laser light beam, and the laser light beam is controlled by an automatic laser power control (ALPC) circuit to have the designated power value with high precision. In this way, data are recorded on the optical disk 10 in the CD-standard format and at the CD-standard transfer rate and linear velocity (1.2–1.4 m/s).

Then, as a reproducing laser light beam, lower in power value than the recording laser light beam, is irradiated onto the optical disk 10 for reproduction of the recorded data, each data read out from the disk 10 is demodulated by a signal reproducing circuit 30 and output directly as a digital signal or as an analog signal after conversion by a D/A converter 31.

Figure 1:
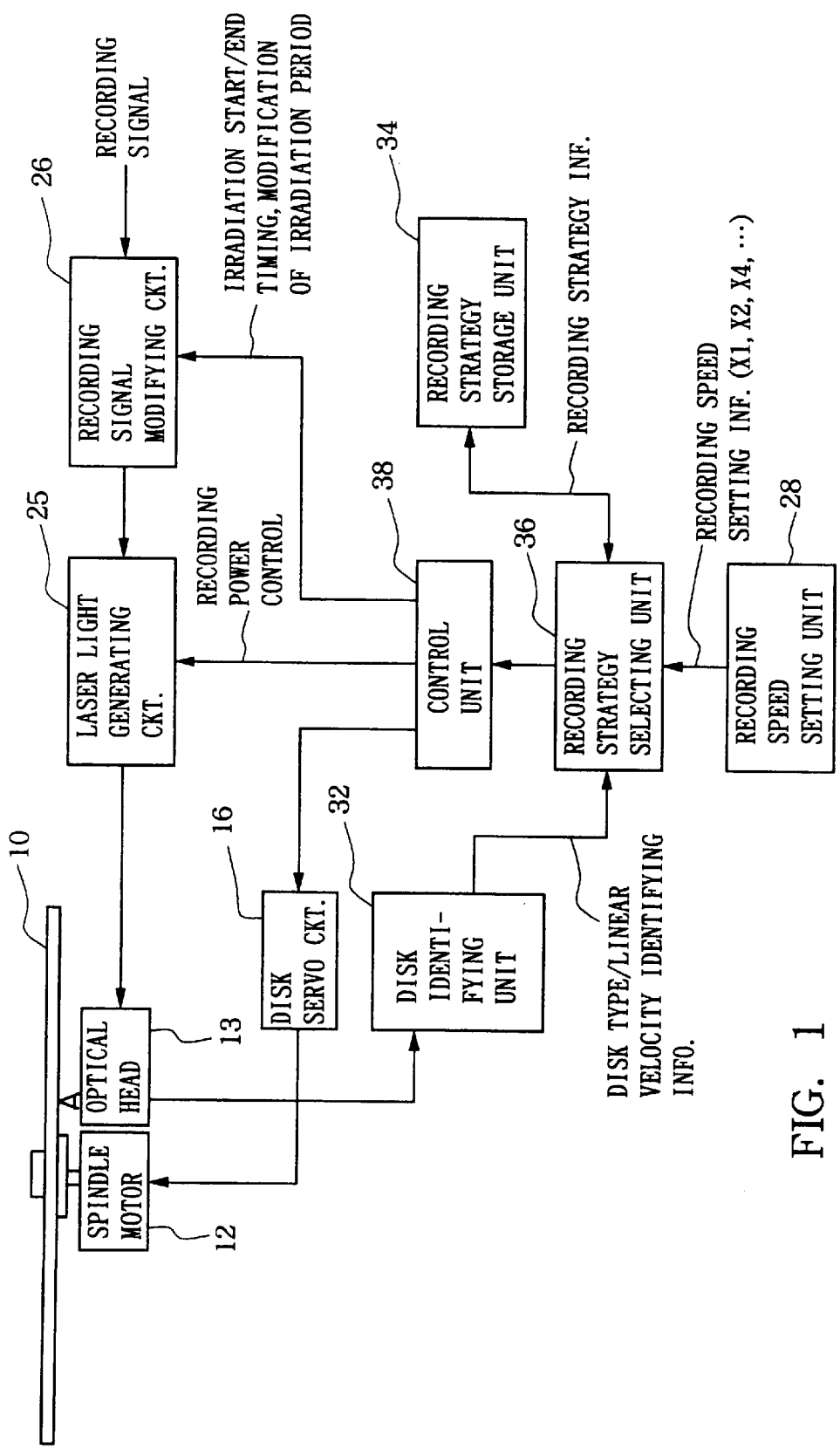
FIG. 1 is a control block diagram showing recording control performed by a system controller in an optical disk recording device in accordance with an embodiment of the present invention.
Figure 2:
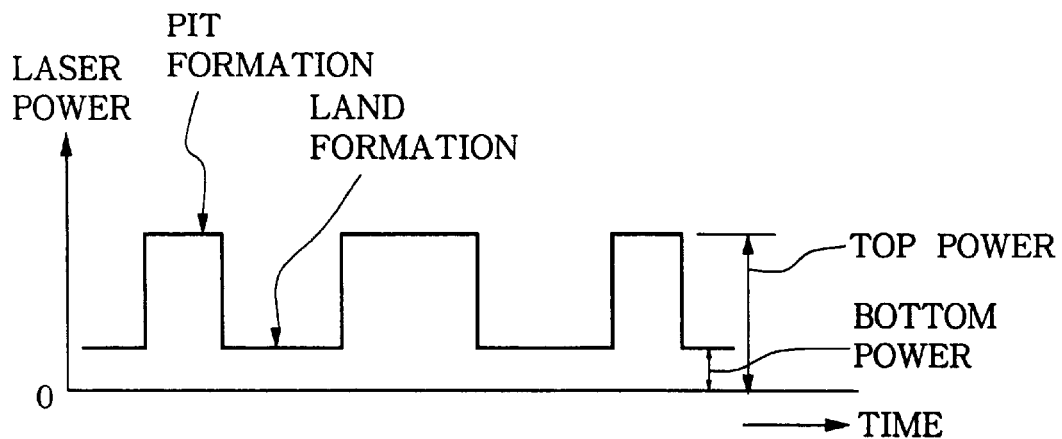
FIG. 2 is a waveform diagram showing a power variation, over time, of a laser light beam employed in prior art.
Figure 3:
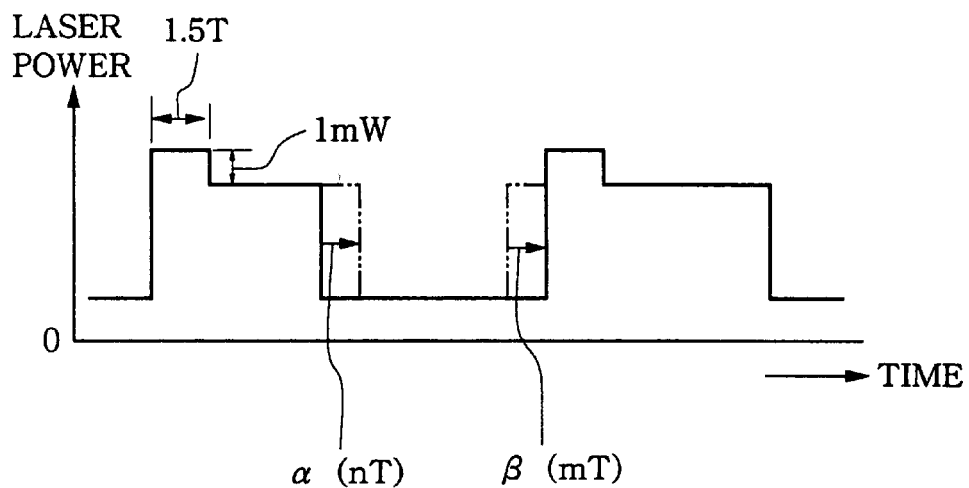
FIG. 3 is a waveform diagram showing a power variation, over time, of the laser light beam employed in prior art to which a top-power-increasing additional pulse was imparted to each top power irradiation period.

FIG. 1 is a control block diagram showing the recording control performed by the system controller 19 of FIG. 6. In FIG. 1, a recording speed setting unit 28 corresponds to the input device 28 of FIG. 6, which sets a recording speed (×1, ×2, ×4, ×6 or the like) selected by the human operator. Disk identifying unit 32 identifies the type and linear velocity of the optical disk 10 set in the optical recording device. The disk type can be identified from, for example, pre-recorded disk ID information on the optical disk 10 which includes a piece of information representative of the disk type. Further, the linear velocity can be identified, for example, on the basis of a recording time length (such as 63 or 74 minutes or other time lengths between the 63-minute and 74-minute lengths) represented by an ATIP signal recorded in the lead-in area of the disk, or can be calculated on the basis of outputs from an encoder counting the rotations of the spindle motor; for example, the linear velocity is 1.4 m/s for the 63-minute recording time and 1.2 m/s for the 74-minute recording time.

Recording strategy storage unit 34 has stored therein optimum recording strategies, such as amounts of time modulation and recording power values, in association with combinations of various disk types, linear velocities and recording speeds. Recording strategy selecting unit 36 selects and reads out, from the recording strategy storage unit 34, one of the optimum recording strategies which corresponds to a combination of the identified disk type, linear velocity and recording speed. Control unit 38 controls the recording-signal modifying circuit 26, in accordance with the recording strategy read out from the storage unit 34, to modulate the lengths of pit-forming and blank-forming sections of the recording signal. The control unit 38 also controls the laser light generating circuit 25 so as to control the laser light power. In addition, the control unit 38 controls the disk servo circuit 16 so as to control the spindle motor 12 to rotate at a rate corresponding to the selected recording speed.

Figure 7:
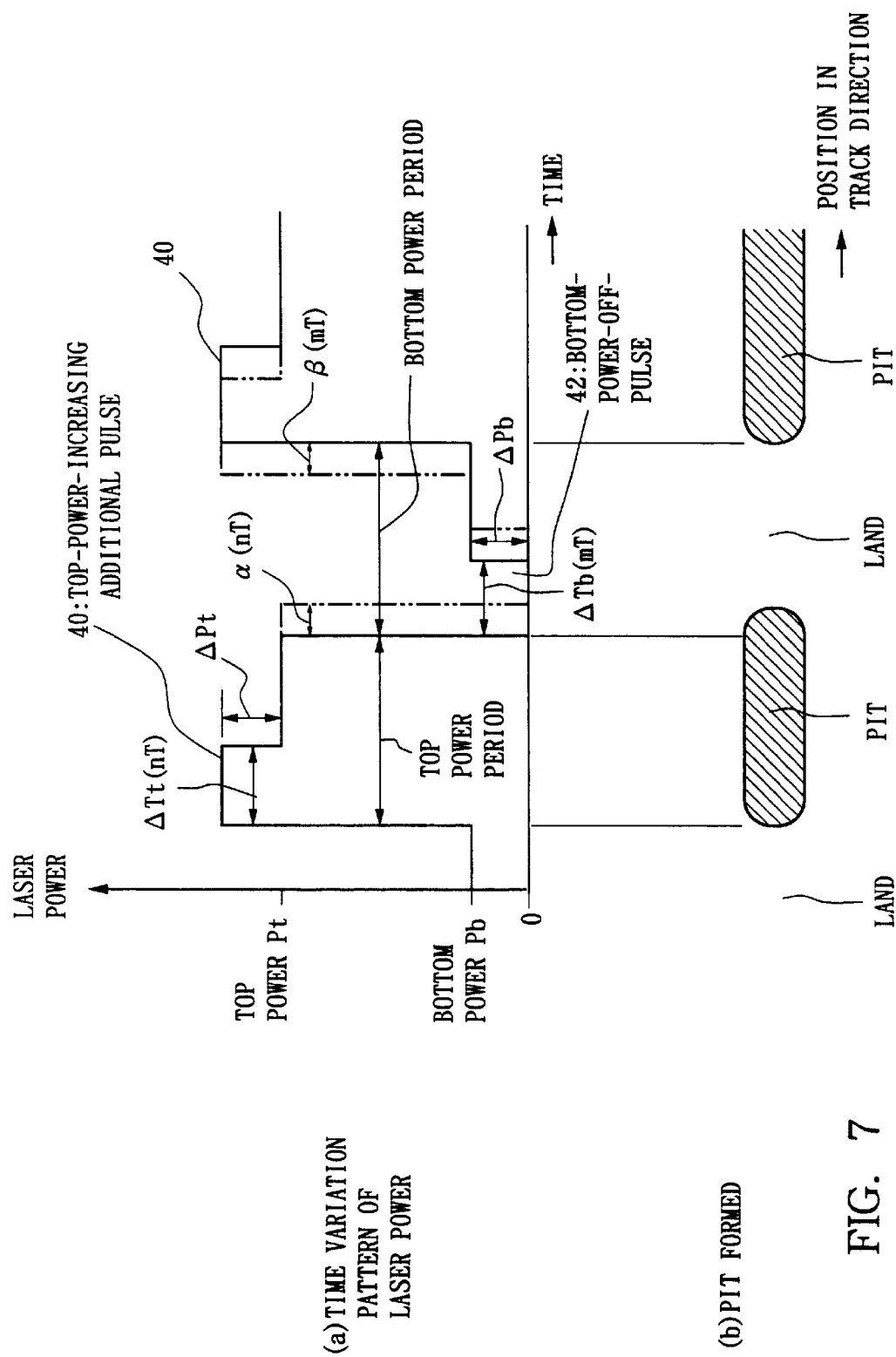
FIG. 7 is a diagram showing an exemplary variation, over time, in power value of a recording light beam employed in the present invention, as well as respective shapes of pits and lands formed in and on the recording surface of an optical disk by use of the laser light beam.

Set forth below are details of recording-power irradiation time control and recording power control that are performed by the control unit 38 of FIG. 1, for example, in the six-times-speed recording mode. Section (a) of FIG. 7 shows an exemplary variation over time in the power value of the recording laser light beam which results from the control performed by the control unit 38, and section (b) of FIG. 7 shows respective shapes, as viewed in plan, of pits and lands formed in and on the recording surface of the optical disk as a result of such control. The control unit 38 sets the laser light beam to a top power value Pt capable of forming a pit for each pit-forming section and to a bottom power value Pb incapable of forming a pit so as not to form a pit, i.e., so as to form a land, between the pit-forming sections. Further, a top-power-increasing additional pulse 40 is formed and imparted to the beginning of a top power irradiation period Pt of the laser light beam, and a bottom-power-off pulse 42 is formed and imparted to the beginning of each bottom power irradiation period Pb of the laser light beam. In the embodiment, it is assumed that the top power irradiation period contains the duration of of the top-power-increasing additional pulse 40 and the bottom power irradiation period contains the duration of the bottom-power-off pulse 42.

The top-power-increasing additional pulse 40 is greater in peak value than the following portion of the top power irradiation Pt by an increase ΔPt, and this power increase ΔPt is set to be smaller than a difference between the top power value Pt and the bottom power value Pb (Pt−Pb). The power increase ΔPt may be either constant (e.g., 1.5 mW) irrespective of the length of a pit to be formed, or variable in accordance with the length of a pit to be formed. Further, the bottom-power-off pulse 42 is smaller in value than the following portion of the bottom power irradiation Pb by a decrease ΔPb, and this power decrease ΔPb is set to be smaller than a difference between the top power value Pt and the bottom power value Pb (Pt−Pb). The power decrease ΔPb in this embodiment is constant (e.g., 0 mW) irrespective of the length of a pit to be formed; it may of course be set to any suitable finite value.

In accordance with a desired length nT of a pit to be formed (n=1, 2, . . . , 11) and a length mT of a land immediately preceding the pit (m=1, 2, . . . , 11), the control unit 38 sets a time length of each of the top power irradiations of the laser light beam on the basis of a basic recording strategy of (n−K)T+β(mT)−β(mT), where "K" is a constant;
"α(nT)" represents an amount of fine adjustment per pit length and, for example,

α(3T)≧α(4T)≧α(5T), . . . ,α(8T)(α(3T)≧α(8T));

"β(mT)" represents an amount of fine adjustment for each preceding land's length and, for example,

β(3T)≧β(4T)≧β(5T), . . . ,≧β(8T)(β(3T)≧β(8T))

In addition, the control unit 38 performs control to vary the duration or width ΔTt(nT) of the top-power-increasing additional pulse 40 in accordance with the desired length nT of the pit to be formed. Similarly, the control unit 38 performs control to vary the duration or width ΔTb(mT) of the bottom-power-off pulse 42 in accordance with the desired length mT of the land to be formed. The widths ΔTt(nT) and ΔTb(mT) of the pulses 40 and 42 are set, for each of the pit lengths nT and land lengths mT, such that various conditions, such as jitter, deviation and error rate, of the pit or land are optimized when recording is executed in the six-times-speed recording mode using the aforesaid basic recording strategy. Alternatively, the above-mentioned variable control may be performed on either one of the widths ΔTt(nT) and ΔTb(mT) of the top-power-increasing additional pulse 40 and bottom-power-off pulse 42.

Basic recording strategy containing the top power and bottom power values Pt and Pb and various parameters ΔTt(nT), ΔTb(mT), ΔPt and ΔPb of the top-power-increasing additional pulse 40 and bottom-power-off pulse 42 are set for each of the disk types and recording speeds and, if necessary, linear velocities as well, and they are stored in the recording strategy storage unit 34 of FIG. 1. In recording, the basic recording strategy and various parameters ΔTt(nT), ΔTb(mT), ΔPt and ΔPb of the top-power-increasing additional pulse 40 and bottom-power-off pulse 42 corresponding to the type of the disk used and selected recording speed (and, if necessary, linear velocity) are read out from the recording strategy storage unit 34, in accordance with which the recording-signal modifying circuit 26 and laser light generating circuit 25 of FIG. 1 are controlled by the control unit 38. Specifically, the recording-signal modifying circuit 26 is controlled in accordance with time information of the read-out basic recording strategy, and the laser light generating circuit 25 is controlled in accordance with the read-out top power and bottom power values Pt and Pb and various parameters ΔTt(nT), ΔTb(mT), ΔPt and ΔPb of the top-power-increasing additional pulse 40 and bottom-power-off pulse 42. Then, a recording laser light beam is irradiated from the optical head 13 onto the recording surface of the optical disk 10 so that 3T–11T pits and lands are formed on the optical disk 10 for recording of desired information. Note that the time adjustment amounts α(nT), β(mT), ΔTt(nT), ΔTb(mT) are of same time resolution; for example, the time resolution is 3.6 ns. when clock pulses of 276 MHz are generated through the "33.8×4×(98/96)×2" circuit processing using a crystal oscillator of 33.8 MHz, and this time resolution corresponds to a 0.09T time length in the six-times-speed recording mode.

Figure 4:
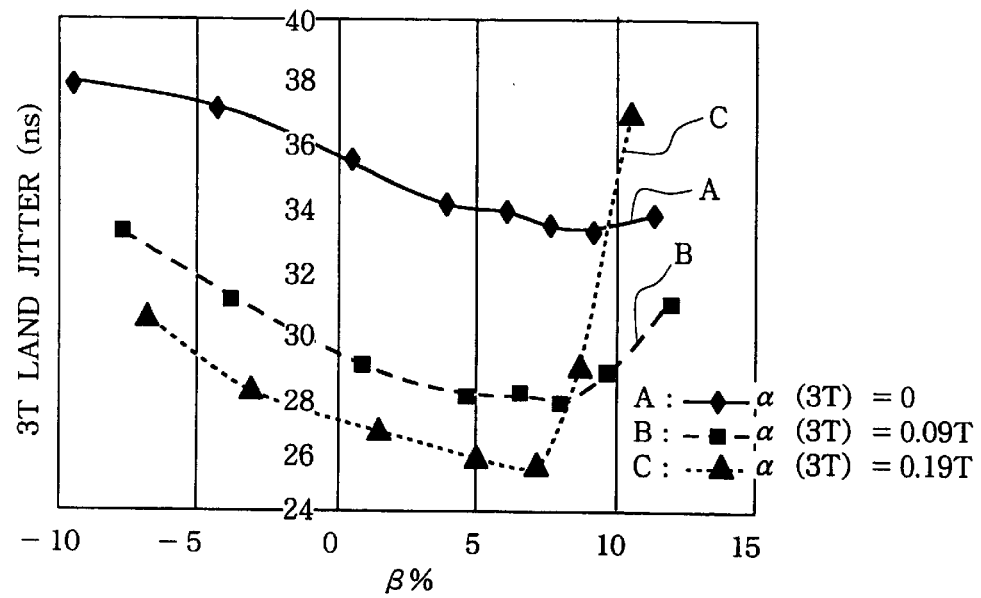
FIG. 4 is a diagram showing a jitter characteristic of a 3T land when recording was executed using the laser light beam of FIG. 3.
Figure 5:
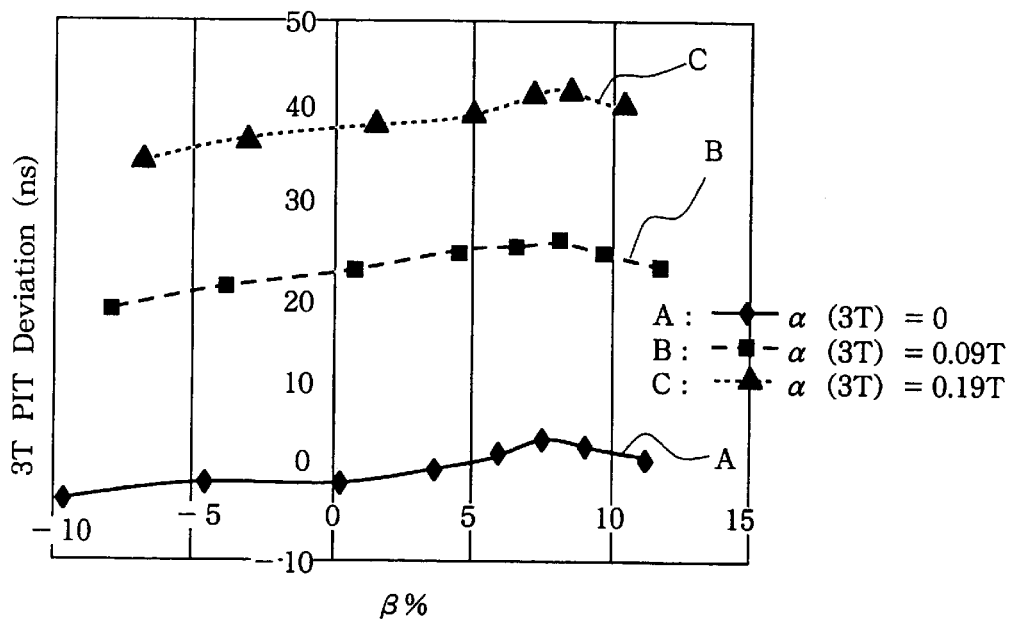
FIG. 5 is a diagram showing a deviation characteristic of a 3T pit when recording was executed using the laser light beam of FIG. 3.

The following paragraphs describe a specific example of recording actually performed by the optical disk recording device of the present invention. In this example, recording is performed on an optical disk containing phthalocyanine, similar to that used in the above-described measurements of FIGS. 4 and 5, using the same basic recording strategy of "(n−0.2)T+α(nT)−0.09T" as the above-described measurements and also with the top power Pt and bottom power Pb set to the same values as in the measurements. The width ΔTt(nT) of the top-power-increasing additional pulse 40 was set as follows in accordance with a desired length nT of a pit to be formed:

ΔTt(3T)=1.5T

ΔTt(4T) to ΔTt(11T)=1.0T

Further, the increase ΔPt of the top-power-increasing additional pulse 40 was set to 1.5 mW for each pitch length. In addition, the width ΔTb(mT) of the bottom-power-off pulse 42 was set to 1.0T, and the decrease ΔPb of the pulse 42 was set to Pb; namely, the absolute power value of the off pulse 42 was set to 0 mW.

Figure 8:
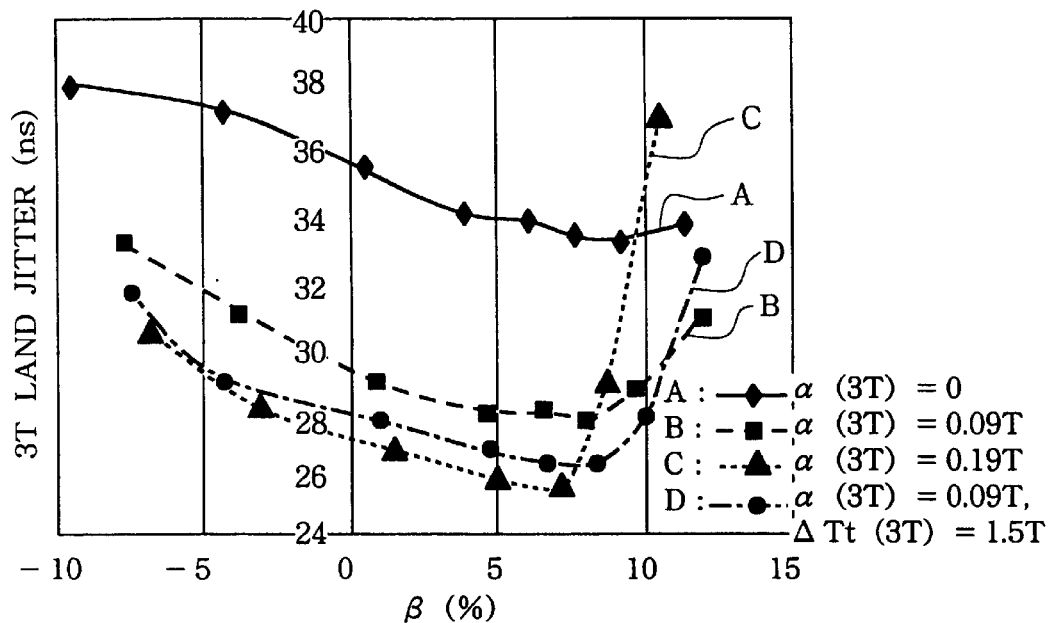
FIG. 8 is a diagram showing a jitter characteristic of a 3T land when recording was executed using the laser light beam of FIG. 7.
Figure 9:
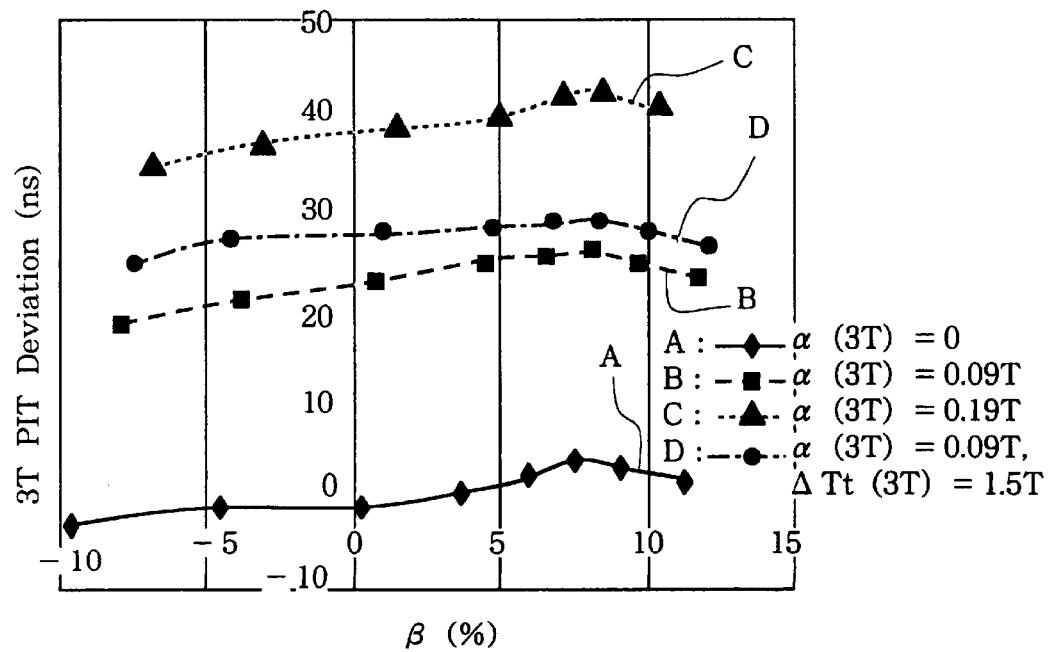
FIG. 9 is a diagram showing a deviation characteristic of a 3T pit when recording was executed using the laser light beam of FIG. 7.

FIGS. 8 and 9 show measurements of jitter in a 3T land and deviation of a 3T pit which were obtained by playing back the optical disk having been recorded under the above-mentioned conditions. Curves A, B and C in FIGS. 8 and 9 are the same as curves A, B and C in FIGS. 4 and 5, while curve D in FIGS. 8 and 9 represents characteristics unique to the recording of the present invention. As seen from curve D, the jitter characteristic in the 3T land have been greatly improved with the deviation of the 3T pit falling properly within a permissible range.

It should be appreciated that although the present invention is particularly useful in high-speed recording, e.g., at the six-times or higher speed, the present invention is also applicable to less-fast recording at speeds higher than the normal speed but lower than the six-times speed.

Now, a detailed description will be made hereinbelow about how irradiation time of the laser light beam is controlled by the control unit 38 of FIG. 1.

Figure 10:
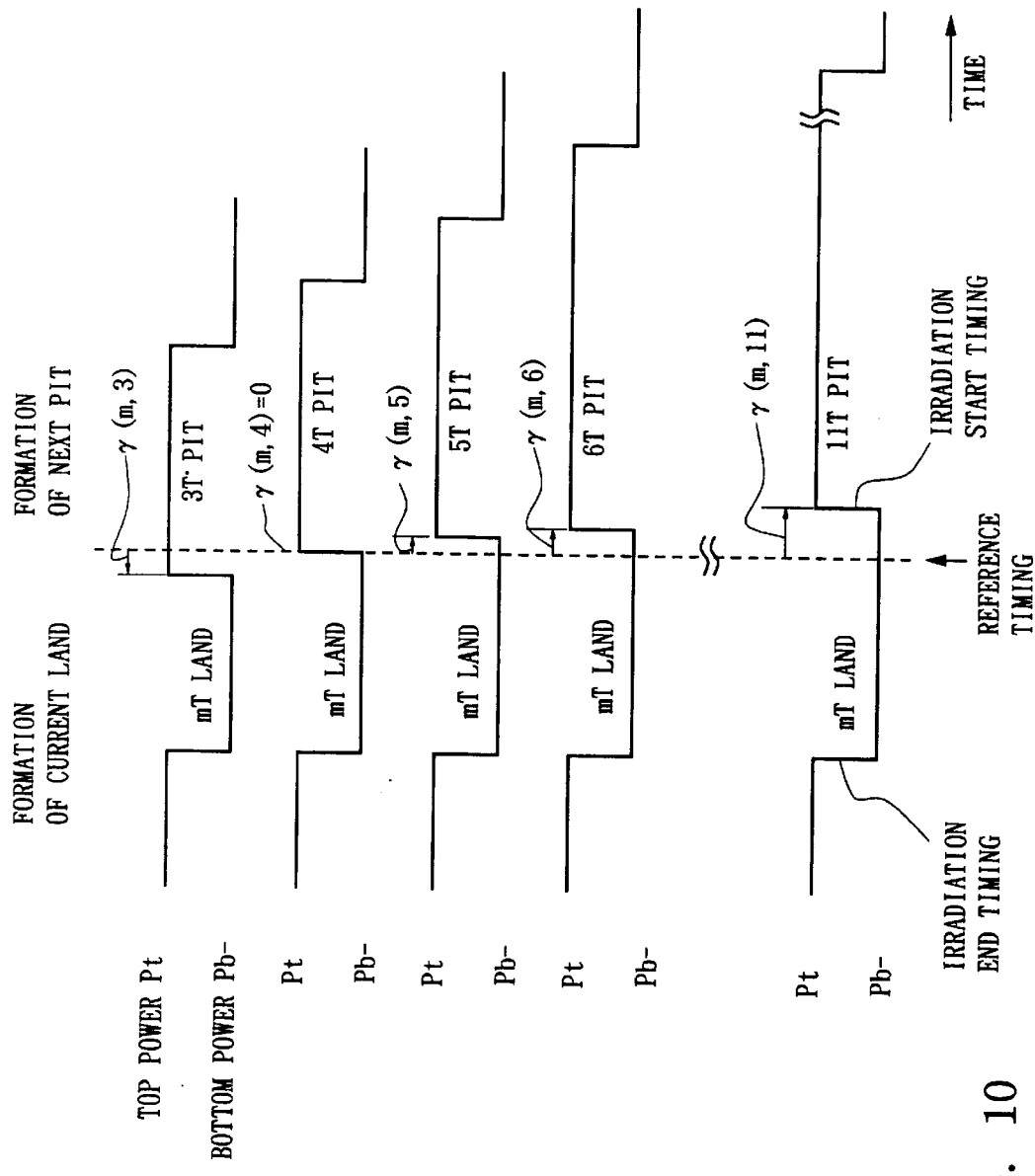
FIG. 10 is a waveform diagram explanatory of control for modifying recording-power irradiation start timing of the laser light beam according to a length of a pit to be next formed.

[1] Modification of Recording-power Irradiation Start Timing of Laser Light Beam According to a Next Pit Length:

As generally known, more laser light heat tends to accumulate in the optical disk as the length of a pit to be formed becomes greater, which would result in the pit's fore end being undesirably expanded forward. To avoid such an inconvenience in forming a relatively long pit, the control section 38 delays the recording-power irradiation start timing of the laser light beams as compared to a case where a pit of a smaller length is to be formed. FIG. 10 shows exemplary variations in a modification amount γ(m, n) of the recording-power irradiation start timing, relative to predetermined reference timing (i.e., unmodified timing), according to the length nT of a pit to be next formed, where it is assumed that the length mT of a currently-formed land is constant. In FIG. 10, the amplitude of each waveform represents laser power intensity, "Pt" a top power level capable of recording information (recording power level), and "Pb" a bottom power level capable of reproducing recorded information but incapable of recording information (reproducing power level). The modification amount $\gamma(m, n)$ is set to satisfy conditions of the following mathematical expressions (1) to (4) and its value (%) is a proportion relative to the time length of 1T:

when the length of the next pit is 3T:

$$-12\% \leq \gamma(3,3) \leq \gamma(4,3) \leq \ldots \leq \gamma(11,3) \leq 0\%(\gamma(3,3) < \gamma(11,3)) \quad (1)$$

when the length of the next pit is 4T:

$$\gamma(3,4) = \gamma(4,4) \ldots \gamma(11,4) = 0\% \quad (2)$$

when the length of the next pit is within a range of 5T to 11T:

$$6\% \geq \gamma(3,n) \geq \gamma(4,n) \geq \ldots \geq \gamma(11,n) \geq 0\%(\gamma(3,n) > \gamma(11,n)) \quad (3)$$

when the length mT of the current land is constant:

$$-12\% \leq \gamma(m,3) \leq \gamma(m,4) = 0\% \leq \gamma(m,5) \leq \gamma(m,6) \leq \ldots \leq \gamma(m,11) \leq 6\%(\gamma(m,3) < \gamma(m,11)) \quad (4)$$

Figure 11:
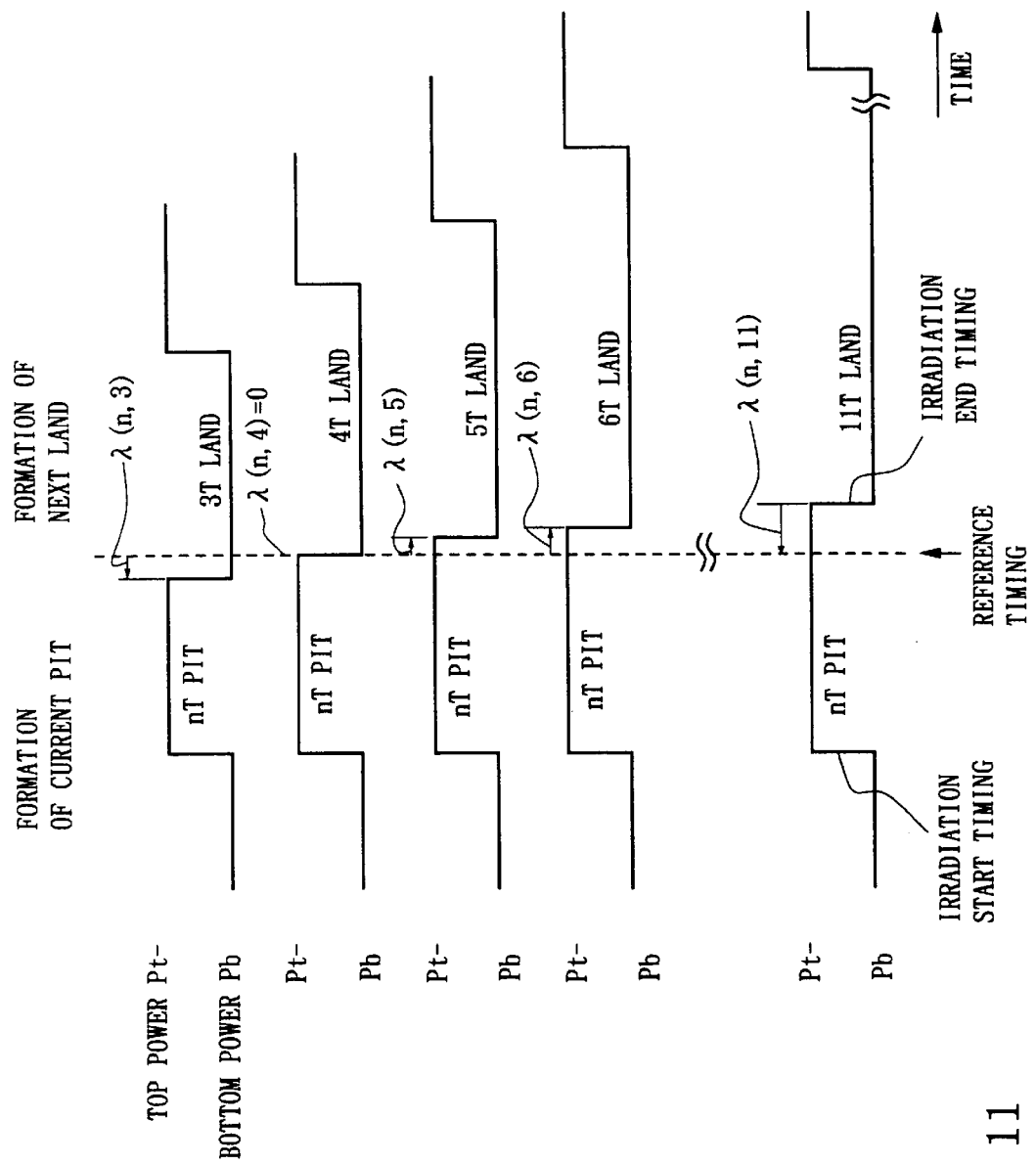
FIG. 11 is a waveform diagram explanatory of control for modifying recording-power irradiation end timing of the laser light beam according to a length of a land to be next formed.

[2] Modification of Recording-power Irradiation End Timing of Laser Light beam According to a Next Land Length:

When a land of a relatively small length is formed, the heat of the laser light beam used for forming a next pit tends to transfer via the land to a preceding pit, which would result in the preceding pit's rear end being undesirably expanded rearward away from its fore end. To avoid such an inconvenience in forming a relatively short land, the control section 38 advances the recording-power irradiation end timing of the laser light beam as compared to a case where a longer land is to be formed. FIG. 11 shows exemplary variations in a modification amount $\lambda(m, n)$ of the recording-power irradiation end timing, relative to predetermined reference timing according to the length T of a land to be next formed, where it is assumed that the length nT of a currently-formed pit is constant. In FIG. 11, the modification amount $\lambda(n, m)$ is set to satisfy conditions of the following mathematical expressions (5) to (8) and its value (%) is a proportion relative to the time length of 1T:

when the length of the next land is 3T:

$$-12\% \leq \lambda(3,3) \leq \lambda(4,3) \leq \ldots \leq \lambda(11,3) \leq 0\%(\lambda(3,3) < \lambda(11,3)) \quad (5)$$

when the length of the next land is 4T:

$$\lambda(3,4) = \lambda(4,4) \ldots \lambda(11,4) = 0\% \quad (6)$$

when the length of the next land is within a range of 5T to 11T:

$$6\% \geq \lambda(3,m) \geq \lambda(4,m) \geq \ldots \geq \lambda(11,m) \geq 0\%(\lambda(3,m) > \lambda(11,m)) \quad (7)$$

when the length nT of the current pit is constant:

$$-12\% \leq \lambda(n,3) \leq \lambda(n,4) = 0\% \leq \lambda(n,5) \leq \lambda(n,6) \leq \ldots \leq \lambda(n,11) \leq 6\%(\lambda(n,3) < \lambda(n,11)) \quad (8)$$

[3] Modification of Recording-power Irradiation Start Timing of Laser Light Beam According to a Preceding Land Length and Modification of Recording-power Irradiation End Timing of Laser Light Beam According to a Current Pit Length:

The control unit 38 controls the duration of the top power irradiation in accordance with the length nT of a pit to be formed and the length mT of a land immediately immediately preceding the pit, using the previously described "$(n-K)T+\alpha(nT)-\beta(mT)$" recording strategy", where "K" is a constant, "$\alpha(nT)$" represents an amount of modification per pit length which is to be added to the end of each top power irradiation period to delay termination of the top power, and at least $$\alpha(3T) \geq \alpha(4T) \geq \alpha(5T), \ldots, \geq \alpha(8T)(\alpha(3T) > \alpha(8T)) \quad (9)$$

"$\beta(mT)$" represents an amount of modification for each preceding land length which is to be added to the beginning of each top power irradiation period to delay a start of the top power, and at least $$\beta(3T) \geq \beta(4T) \geq \beta(5T), \ldots, \geq \beta(8T)(\beta(3T) > \beta(8T)) \quad (10)$$

Figure 12:
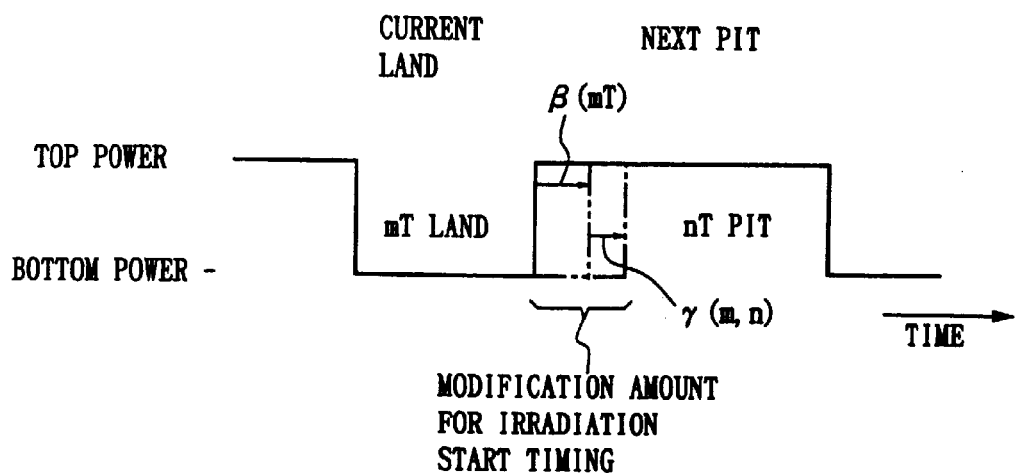
FIG. 12 is a waveform diagram explanatory of control for modifying the recording-power irradiation start timing of the laser light beam according to a combination of lengths of a currently-formed land and a pit to be next formed.
Figure 13:
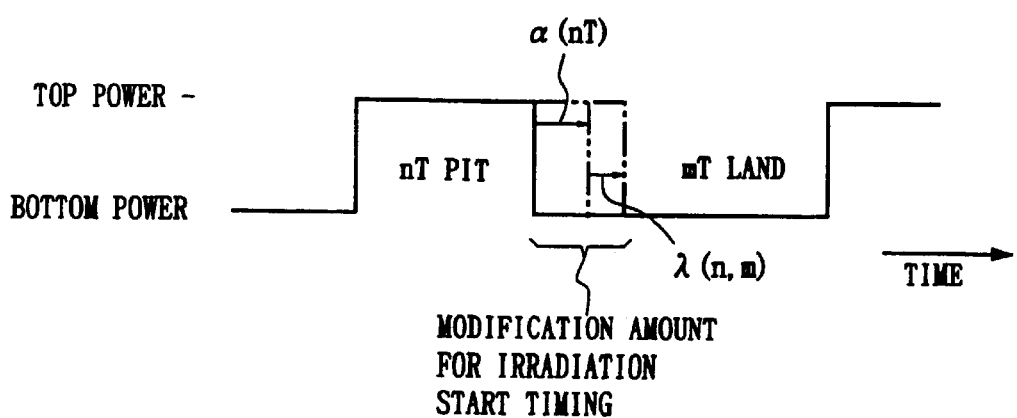
FIG. 13 is a waveform diagram explanatory of control for modifying the recording-power irradiation end timing of the laser light beam according to a combination of lengths of a currently-formed pit and a land to be next formed.

The control unit 38 of FIG. 1 performs the control, as described in items [1], [2] and [3] above, in combination. Namely, to control the timing to start recording-power irradiation of the laser light beam, the control unit 38 executes modification by a sum of the modification amount $\beta(mT)$ based on the current land length and the modification amount $\lambda(m, n)$ based on the next pit length, as shown in FIG. 12. To control the timing to end the recording-power irradiation of the laser light beam, the control unit 38 executes modification by a sum of the modification amount $\alpha(nT)$ based on the current pit length and the modification amount $\lambda(n, m)$ based on the next land length, as shown in FIG. 13.

Mo specifically, for these purposes, sums of the modification amounts $\beta(mT)+\lambda(m, n)$ for the irradiation start timing, corresponding to various possible combinations of the current land length and next pit length, are prestored in the recording strategy storage unit 34 of FIG. 1, as exemplarily shown in table 1 below. Similarly, sums of the modification amounts $\alpha(nT)+\lambda(n, m)$ for the irradiation end timing, corresponding to various possible combinations of the current pit length and next land length, are prestored in the recording strategy storage unit 34, as exemplarily shown in table 2 below.

TABLE 1

| next pit | current land | | | | | | | | |
|---|---|---|---|---|---|---|---|---|---|
| | 3T | 4T | 5T | 6T | 7T | 8T | 9T | 10T | 11T |
| 3T | $\beta(3T) + \gamma(3.3)$ | $\beta(4T) + \gamma(4.3)$ | $\beta(5T) + \gamma(5.3)$ | $\beta(6T) + \gamma(6.3)$ | $\beta(7T) + \gamma(7.3)$ | $\beta(8T) + \gamma(8.3)$ | $\beta(9T) + \gamma(9.3)$ | $\beta(10T) + \gamma(10.3)$ | $\beta(11T) + \gamma(11.3)$ |
| 4T | $\beta(3T) + \gamma(3.4)$ | $\beta(4T) + \gamma(4.4)$ | $\beta(5T) + \gamma(5.4)$ | $\beta(6T) + \gamma(6.4)$ | $\beta(7T) + \gamma(7.4)$ | $\beta(8T) + \gamma(8.4)$ | $\beta(9T) + \gamma(9.4)$ | $\beta(10T) + \gamma(10.4)$ | $\beta(11T) + \gamma(11.4)$ |

TABLE 1-continued

| next pit | current land | | | | | | | | |
|---|---|---|---|---|---|---|---|---|---|
| | 3T | 4T | 5T | 6T | 7T | 8T | 9T | 10T | 11T |
| 5T | β (3T) + γ (3.5) | β (4T) + γ (4.5) | β (5T) + γ (5.5) | β (6T) + γ (6.5) | β (7T) + γ (7.5) | β (8T) + γ (8.5) | β (9T) + γ (9.5) | β (10T) + γ (10.5) | β (11T) + γ (11.5) |
| 6T | β (3T) + γ (3.6) | β (4T) + γ (4.6) | β (5T) + γ (5.6) | β (6T) + γ (6.6) | β (7T) + γ (7.6) | β (8T) + γ (8.6) | β (9T) + γ (9.6) | β (10T) + γ (10.6) | β (11T) + γ (11.6) |
| 7T | β (3T) + γ (3.7) | β (4T) + γ (4.7) | β (5T) + γ (5.7) | β (6T) + γ (6.7) | β (7T) + γ (7.7) | β (8T) + γ (8.7) | β (9T) + γ (9.7) | β (10T) + γ (10.7) | β (11T) + γ (11.7) |
| 8T | β (3T) + γ (3.8) | β (4T) + γ (4.8) | β (5T) + γ (5.8) | β (6T) + γ (6.8) | β (7T) + γ (7.8) | β (8T) + γ (8.8) | β (9T) + γ (9.8) | β (10T) + γ (10.8) | β (11T) + γ (11.8) |
| 9T | β (3T) + γ (3.9) | β (4T) + γ (4.9) | β (5T) + γ (5.9) | β (6T) + γ (6.9) | β (7T) + γ (7.9) | β (8T) + γ (8.9) | β (9T) + γ (9.9) | β (10T) + γ (10.9) | β (11T) + γ (11.9) |
| 10T | β (3T) + γ (3.10) | β (4T) + γ (4.10) | β (5T) + γ (5.10) | β (6T) + γ (6.10) | β (7T) + γ (7.10) | β (8T) + γ (8.10) | β (9T) + γ (9.10) | β (10T) + γ (10.10) | β (11T) + γ (11.10) |
| 11T | β (3T) + γ (3.11) | β (4T) + γ (4.11) | β (5T) + γ (5.11) | β (6T) + γ (6.11) | β (7T) + γ (7.11) | β (8T) + γ (8.11) | β (9T) + γ (9.11) | β (10T) + γ (10.11) | β (11T) + β (11.11) |

TABLE 2

| next pit | current land | | | | | | | | |
|---|---|---|---|---|---|---|---|---|---|
| | 3T | 4T | 5T | 6T | 7T | 8T | 9T | 10T | 11T |
| 3T | α (3T) + λ (3.3) | α (4T) + λ (4.3) | α (5T) + λ (5.3) | α (6T) + λ (6.3) | α (7T) + λ (7.3) | α (8T) + λ (8.3) | α (9T) + λ (9.3) | α (10T) + λ (10.3) | α (11T) + λ (11.3) |
| 4T | α (3T) + λ (3.4) | α (4T) + λ (4.4) | α (5T) + λ (5.4) | α (6T) + λ (6.4) | α (7T) + λ (7.4) | α (8T) + λ (8.4) | α (9T) + λ (9.4) | α (10T) + λ (10.4) | α (11T) + λ (11.4) |
| 5T | α (3T) + λ (3.5) | α (4T) + λ (4.5) | α (5T) + λ (5.5) | α (6T) + λ (6.5) | α (7T) + λ (7.5) | α (8T) + λ (8.5) | α (9T) + λ (9.5) | α (10T) + λ (10.5) | α (11T) + λ (11.5) |
| 6T | α (3T) + λ (3.6) | α (4T) + λ (4.6) | α (5T) + λ (5.6) | α (6T) + λ (6.6) | α (7T) + λ (7.6) | α (8T) + λ (8.6) | α (9T) + λ (9.6) | α (10T) + λ (10.6) | α (11T) + λ (11.6) |
| 7T | α (3T) + λ (3.7) | α (4T) + λ (4.7) | α (5T) + λ (5.7) | α (6T) + λ (6.7) | α (7T) + λ (7.7) | α (8T) + λ (8.7) | α (9T) + λ (9.7) | α (10T) + λ (10.7) | α (11T) + λ (11.7) |
| 8T | α (3T) + λ (3.8) + | α (4T) + λ (4.8) | α (5T) + λ (5.8) | α (6T) + λ (6.8) | α (7T) + λ (7.8) | α (8T) + λ (8.8) | α (9T) + λ (9.8) | α (10T) + λ (10.8) | α (11T) + λ (11.8) |
| 9T | α (3T) + λ (3.9) | α (4T) + λ (4.9) | α (5T) + λ (5.9) | α (6T) + λ (6.9) | α (7T) + λ (7.9) | α (8T) + λ (8.9) | α (9T) + λ (9.9) | α (10T) + λ (10.9) | α (11T) + λ (11.9) |
| 10T | α (3T) + λ (3.10) | α (4T) + λ (4.10) | α (5T) + λ (5.10) | α (6T) + λ (6.10) | α (7T) + λ (7.10) | α (8T) + λ (8.10) | α (9T) + λ (9.10) | α (10T) + λ (10.10) | α (11T) + λ (11.10) |
| 11T | α (3T) + λ (3.11) | α (4T) + λ (4.11) | α (5T) + λ (5.11) | α (6T) + λ (6.11) | α (7T) + λ (7.11) | α (8T) + λ (8.11) | α (9T) + λ (9.11) | α (10T) + λ (10.11) | α (11T) + λ (11.11) |

Thus, the control unit 38 detects a combination of a current land length and next pit length from each input recording signal and reads out, from the recording strategy storage unit 34, one of the modification amounts β(mT)+λ (m, n) which corresponds to the detected combination, to thereby modify the recording-power irradiation start timing of the laser light beam by the read-out amount. Similarly, the control unit 38 detects a combination of a current pit length and next land length represented by the input recording signal and reads out, from the recording strategy storage unit 34, one of the modification amounts α(nT)+λ(n, m) which corresponds to the detected combination, to thereby modify the recording-power irradiation end timing of the laser light beam by the read-out amount.

Figure 14:
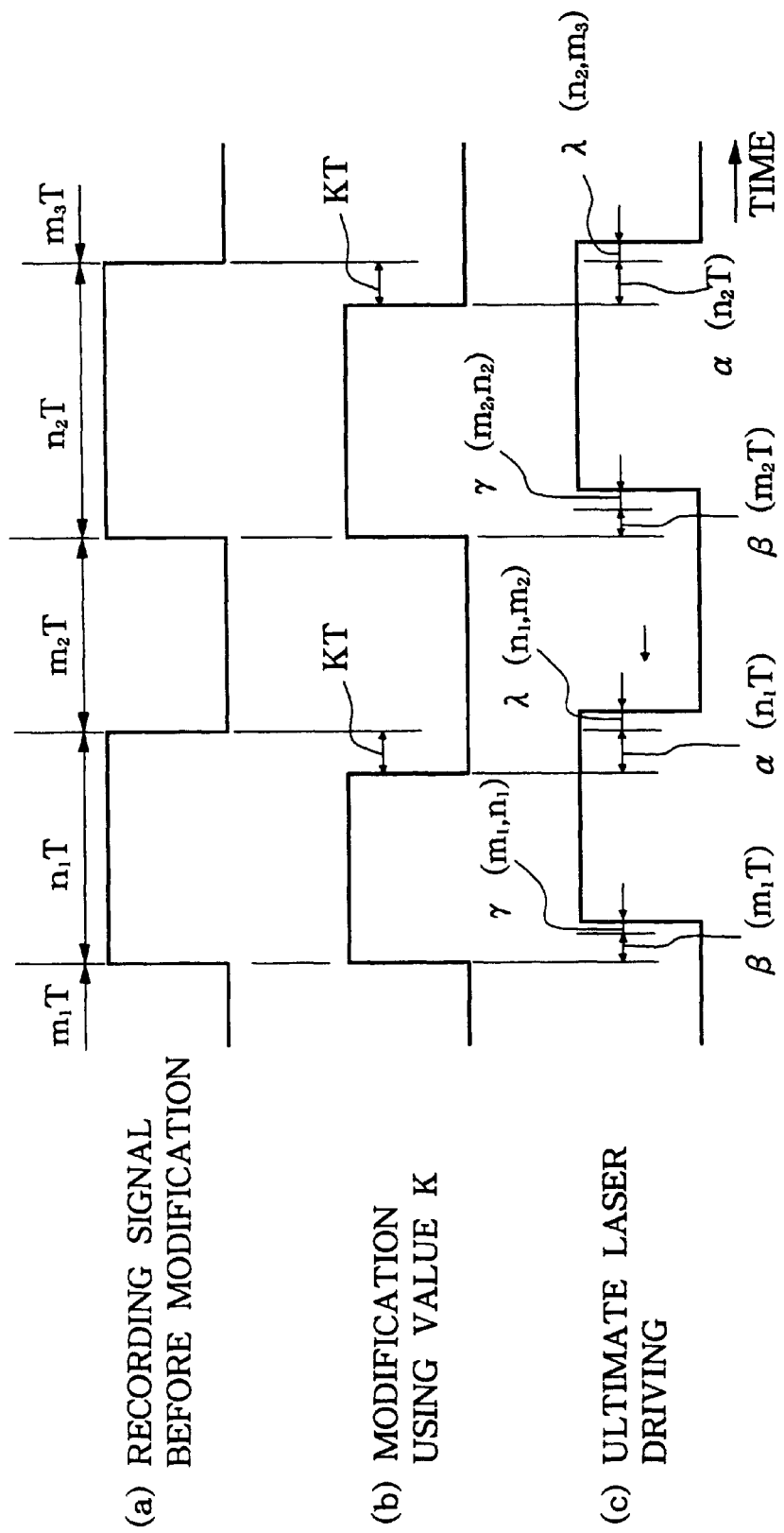
FIG. 14 is a waveform diagram showing an exemplary manner in which a control unit of FIG. 1 modifies the recording-power irradiation start and end timing of the recording laser light beam.

FIG. 14 shows an exemplary manner in which the control unit 38 modifies the recording-power irradiation start and end timing of the laser light beam. In this figure, section "(a)" denotes a recording signal before the timing modification, section "b" denotes the recording signal having been modified by an amount KT, and section "c" denotes the recording signal having been modified by the amounts β(mT)+λ(m, n) and α(nT)+λ(n, m) to provide an ultimate laser driving signal.

Tables 3 and 4 below shows example settings of the modification amounts β(mT)+λ(m, n) and α(nT)+λ(n, m).

TABLE 3

| next pit | current land | | | | | | | | |
|---|---|---|---|---|---|---|---|---|---|
| | 3T | 4T | 5T | 6T | 7T | 8T | 9T | 10T | 11T |
| 3T | β (3T) + −9 | β (4T) + −3 | β (5T) + −3 | β (6T) + 0 | β (7T) + 0 | β (8T) + 0 | β (9T) + 0 | β (10T) + 0 | β (11T) + 0 |
| 4T | β (3T) + 0 | β (4T) + 0 | β (5T) + 0 | β (6T) + 0 | β (7T) + 0 | β (8T) + 0 | β (9T) + 0 | β (10T) + 0 | β (11T) + 0 |

TABLE 3-continued

| next | current land | | | | | | | | |
|---|---|---|---|---|---|---|---|---|---|
| pit | 3T | 4T | 5T | 6T | 7T | 8T | 9T | 10T | 11T |
| 5T | β(3T)+3 | β(4T)+3 | β(5T)+3 | β(6T)+0 | β(7T)+0 | β(8T)+0 | β(9T)+0 | β(10T)+0 | β(11T)+0 |
| 6T | β(3T)+3 | β(4T)+3 | β(5T)+3 | β(6T)+0 | β(7T)+0 | β(8T)+0 | β(9T)+0 | β(10T)+0 | β(11T)+0 |
| 7T | β(3T)+3 | β(4T)+3 | β(5T)+3 | β(6T)+0 | β(7T)+0 | β(8T)+0 | β(9T)+0 | β(10T)+0 | β(11T)+0 |
| 8T | β(3T)+3 | β(4T)+3 | β(5T)+3 | β(6T)+0 | β(7T)+0 | β(8T)+0 | β(9T)+0 | β(10T)+0 | β(11T)+0 |
| 9T | β(3T)+3 | β(4T)+3 | β(5T)+3 | β(6T)+0 | β(7T)+0 | β(8T)+0 | β(9T)+0 | β(10T)+0 | β(11T)+0 |
| 10T | β(3T)+3 | β(4T)+3 | β(5T)+3 | β(6T)+0 | β(7T)+0 | β(8T)+0 | β(9T)+0 | β(10T)+0 | β(11T)+0 |
| 11T | β(3T)+3 | β(4T)+3 | β(5T)+3 | β(6T)+0 | β(7T)+0 | β(8T)+0 | β(9T)+0 | β(10T)+0 | β(11T)+0 |

TABLE 4

| next | current land | | | | | | | | |
|---|---|---|---|---|---|---|---|---|---|
| pit | 3T | 4T | 5T | 6T | 7T | 8T | 9T | 10T | 11T |
| 3T | α(3T)+−6 | α(4T)+−3 | α(5T)+−3 | α(6T)+0 | α(7T)+0 | α(8T)+0 | α(9T)+0 | α(10T)+0 | α(11T)+0 |
| 4T | α(3T)+0 | α(4T)+0 | α(5T)+0 | α(6T)+0 | α(7T)+0 | α(8T)+0 | α(9T)+0 | α(10T)+0 | α(11T)+0 |
| 5T | α(3T)+3 | α(4T)+3 | α(5T)+3 | α(6T)+0 | α(7T)+0 | α(8T)+0 | α(9T)+0 | α(10T)+0 | α(11T)+0 |
| 6T | α(3T)+3 | α(4T)+3 | α(5T)+3 | α(6T)+0 | α(7T)+0 | α(8T)+0 | α(9T)+0 | α(10T)+0 | α(11T)+0 |
| 7T | α(3T)+3 | α(4T)+3 | α(5T)+3 | α(6T)+0 | α(7T)+0 | α(8T)+0 | α(9T)+0 | α(10T)+0 | α(11T)+0 |
| 8T | α(3T)+3 | α(4T)+3 | α(5T)+3 | α(6T)+0 | α(7T)+0 | α(8T)+0 | α(9T)+0 | α(10T)+0 | α(11T)+0 |
| 9T | α(3T)+3 | α(4T)+3 | α(5T)+3 | α(6T)+0 | α(7T)+0 | α(8T)+0 | α(9T)+0 | α(10T)+0 | α(11T)+0 |
| 10T | α(3T)+3 | α(4T)+3 | α(5T)+3 | α(6T)+0 | α(7T)+0 | α(8T)+0 | α(9T)+0 | α(10T)+0 | α(11T)+0 |
| 11T | α(3T)+3 | α(4T)+3 | α(5T)+3 | α(6T)+0 | α(7T)+0 | α(8T)+0 | α(9T)+0 | α(10T)+0 | α(11T)+0 |

Figure 15:
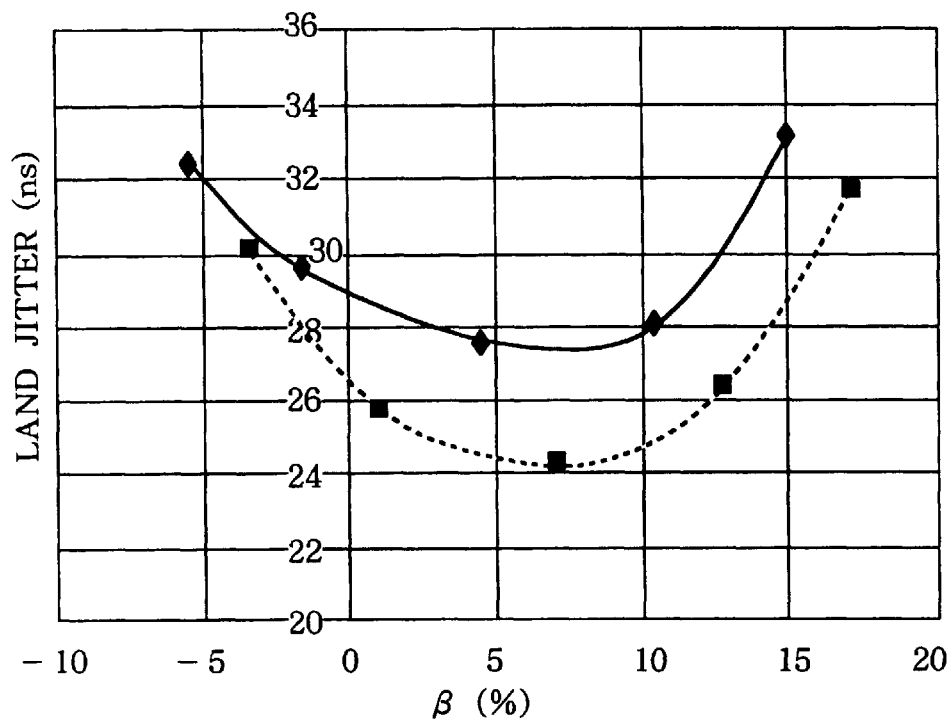
FIG. 15 is a diagram showing pit jitter characteristics presented in one case where the modification of the recording-power irradiation start timing according to next pit and land lengths was performed and in another case where such modification was not performed.
Figure 16:
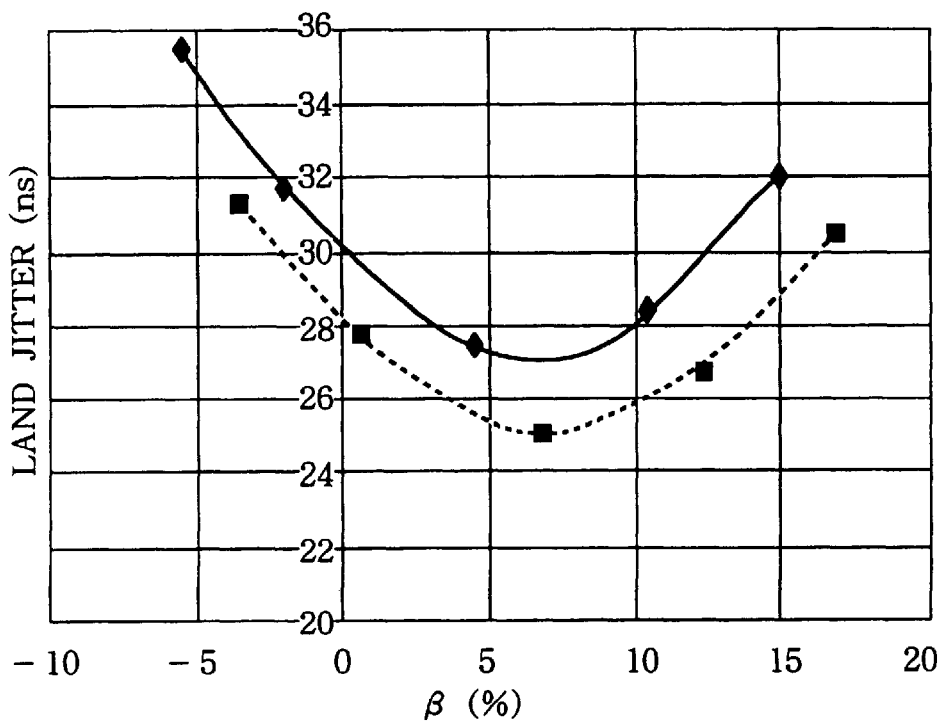
FIG. 16 is a diagram showing land jitter characteristics presented in one case where the modification of the recording-power irradiation start timing according to next pit and land lengths was performed and in another case where such modification was not performed.

The settings of the irradiation start and end timing modification amounts β(mT)+λ(m, n) and α(nT)+λ(n, m) shown in table 3 and table 4 were employed when recording was executed at the double speed on a high-density optical disk containing cyanine. Dotted-line curve in FIG. 15 represents a pit jitter characteristic that was presented in the recording based on the settings, and a dotted-line curve in FIG. 16 represents a land jitter characteristic presented in that recording. Further, a solid-line curve in FIG. 15 represents a pit jitter characteristic that was presented in the recording under the same conditions with the amounts λ(m, n) and λ(n, m) set to 0% (namely, using the modification amounts β(mT) and α(nT)) alone), and a solid-line curve in FIG. 16 represents a land jitter characteristic presented in that recording. Further, the horizontal axis β(%) represents a parameter defined by the CD-WO standard, which is different from the above-mentioned modification amount β(mT).

As seen from FIGS. 15 and 16, the jitter could be reduced and hence the recording signal quality could be enhanced significantly in the case where the modification using the amounts λ(m, n) and λ(n, m) was performed as represented by the dotted line curves, as compared to another case where such modification was not performed at all as represented by the solid-line curve.

Whereas the preferred embodiments have been described above as applied to the optical disk recording according to the CD-WO standard, the present invention may of course be applied other forms of optical disk recording according to other standards based on the mark-length recording scheme.

What is claimed is:

1. An optical disk recording device for forming pits and lands based on a mark-length recording scheme by irradiating a laser light beam onto a recording surface of an optical disk, the laser light beam being set to a top power value capable of forming a pit for each pitforming section and set to a bottom power value incapable of forming a pit for each land-forming section between the pit-forming sections, said optical recording device comprising a control unit that, in recording at a speed higher than a normal speed, performs:

control to cause end timing of a top power irradiation period of the laser light beam to differ from predetermined end timing of a pit to be formed by a specific amount depending on a desired length of the pit or to cause start timing of the top power irradiation period of the laser light beam to differ from predetermined end timing of a land to be formed by a specific amount depending on a desired length of the land; and control to form and impart a top-power-increasing additional pulse to a portion of the top power irradiation period to temporarily increase a value of the top power value by an amount smaller than a difference between the top power value and the bottom power value and also to vary a time length of the top-power-increasing additional-pulse in accordance with the desired length of the pit.

2. An optical disk recording device for forming pits and lands based on a mark-length recording scheme by irradiating a laser light beam onto a recording surface of an optical disk, the laser light beam being set to a top power value capable of forming a pit for each pitforming section and set to a bottom power value incapable of forming a pit for each land-forming section between the pit-forming sections, said optical recording device comprising a control unit that, in recording at a speed higher than a normal speed, performs:

control to cause start timing of a top power irradiation period of the laser light beam to differ from predetermined end timing of a land to be formed by a specific amount depending on a desired length of the land or to cause end timing of the top power irradiation period of the laser light beam to differ from predetermined end timing of a pit to be formed by a specific amount depending on a desired length of the pit; and control to form and impart a bottom-power-off pulse to a portion of a bottom power irradiation period of the laser light beam to temporarily decrease a value of the bottom power value by an amount smaller than a difference between the top power value and the bottom power value and also to vary a time length of the bottom-power-off pulse in accordance with the desired length of the land.

3. An optical disk recording device for forming pits and lands based on a mark-length recording scheme by irradiating a laser light beam onto a recording surface of an optical disk, the laser light beam being set to a top power value capable of forming a pit for each pitforming section and set to a bottom power value incapable of forming a pit for each land-forming section between the pit-forming sections, said optical recording device comprising a control unit that, in recording at a speed higher than a normal speed, performs:

control to cause end timing of a top power irradiation period of the laser light beam to differ from predetermined end timing of a pit to be formed by a specific amount depending on a desired length of the pit and to cause start timing of the top power irradiation period of the laser light beam to differ from predetermined end timing of a land to be formed by a specific amount depending on a desired length of the land;

control to form and impart a top-power-increasing additional pulse to a portion of the top power irradiation period to temporarily increase a value of the top power value by an amount smaller than a difference between the top power value and the bottom power value and also to vary a time length of the top-power-increasing additional pulse in accordance with the desired length of the pit; and control to form and impart a bottom-power-off pulse to a portion of a bottom power irradiation period of the laser light beam to temporarily decrease a value of the bottom power value by an amount smaller than a difference between the top power value and the bottom power value and also to vary a time length of the bottom-power-off pulse in accordance with the desired length of the land.

4. An optical disk recording device as recited in claim 1 or 3 wherein said top-power-increasing additional pulse is set to a same power value for each pit length and is imparted to a beginning of the top power irradiation period of the laser light beam.

5. An optical disk recording device as recited in claim 2 or 3 wherein said bottom-power-off pulse is set to a same power value for each land length and is imparted to a beginning of the bottom power irradiation period of the laser light beam.

6. An optical disk recording method for forming pits and lands alternately based on a mark-length recording scheme by irradiating, onto a recording surface of an optical disk, a laser light beam modulated by a recording signal, said optical disk recording method comprising a step of modifying recording-power irradiation start timing of the laser light beam, to start formation of a pit, according to a length of the pit, said step of modifying recording-power irradiation start timing including a step of, when a pit of a relatively great length is to be formed, delaying the recording-power irradiation start timing as compared to when a pit of a smaller length is to be formed, as long as respective lands immediately preceding the pit of a relatively great length and the pit of a smaller length have a substantially same length, wherein the recording-power irradiation start timing for formation of a pit of a 4T length is set to a predetermined reference timing with no modification, the recording-power irradiation start timing for formation of a pit shorter than the 4T length is advanced ahead of the reference timing, and the recording-power irradiation start timing for formation of a pit longer than the 4T length is delayed behind the reference timing.

7. An optical disk recording method as recited in claim 6 wherein when a pit of a 3T length is to be formed, the recording-power irradiation start timing is advanced ahead of the reference timing by an amount ranging from 0 to 12% of a 1T length, and when a pit of a length between 5T and 11T is to be formed, the recording-power irradiation start timing is delayed behind the reference timing by an amount ranging from 0 to 6% of the 1T length.

8. An optical disk recording method for forming pits and lands alternately based on a mark-length recording scheme by irradiating, onto a recording surface of an optical disk, a laser light beam modulated by a recording signal, said optical disk recording method comprising:

modifying recording-power irradiation end timing of the laser light beam, to start formation of a land, according to a length of the land, and when a land of a relatively small length is to be formed, advancing the recording-power irradiation end timing as compared to when a land of a greater length is to be formed, as long as respective pits immediately preceding the land of a relatively great length and the land of a smaller length have a substantially same length, wherein the recording-power irradiation end timing for formation of a first land of a 4T length is set to predetermined reference timing with no modification, the recording-power irradiation end timing for formation of a second land which is shorter than the 4T length is advanced ahead of the reference timing, and the recording-power irradiation end timing for formation of a third land which is longer than the 4T length is delayed behind the reference timing.

9. An optical disk recording method as recited in claim 8 wherein when a fourth land of a 3T length is to be formed, the recording-power irradiation end timing is advanced ahead of the reference timing by an amount ranging from 0 to 12% of a 1T length, and when a fifth land of a length between 5T and 11T is to be formed, the recording-power irradiation end timing is delayed behind the reference timing by an amount ranging from 0 to 6% of the 1T length.

10. An optical disk recording method for forming pits and lands alternately based on a mark-length recording scheme by irradiating, onto a recording surface of an optical disk, a laser light beam modulated by a recording signal, said optical disk recording method comprising:

a step of modifying recording-power irradiation start timing of the laser light beam, to start formation of a pit, according to a combination of lengths of a pit to be formed and a land immediately preceding the pit; and a step of modifying recording-power irradiation end timing of the laser light beam, to start formation of a land, according to a combination of lengths of a land to be formed and a pit immediately preceding the land, said step of modifying recording-power irradiation start timing of the laser light beam including a step of, when a pit of a relatively great length is to be formed, delaying the recording-power irradiation start timing as compared to when a pit of a smaller length is to be formed as long as respective lands immediately preceding the pit of a relatively great length and the pit of a smaller length have a substantially same length and also, when a land of a relatively small length is to be formed, delaying the recording-power irradiation start timing as compared to when a land of a greater length is to be formed, said step of modifying recording-power irradiation end timing of the laser light beam including a step of, when a land of a relatively small length is to be formed, advancing the recording-power irradiation end timing as compared to when a land of a greater length is to be formed as long as respective pits immediately preceding the land of a relatively small length and the land of a greater length have a substantially same length and also, when a pit of a relatively great length is to be formed, advancing the recording-power irradiation end timing as compared to when a pit of a smaller length is to be formed.

11. An optical disk recording device for forming pits and lands alternately based on a mark-length recording scheme by irradiating, onto a recording surface of an optical disk, a laser light beam modulated by a recording signal, said optical disk recording device comprising:

a storage unit that stores various modification amounts for recording-power irradiation start timing of the laser light beam, to start formation of a pit, corresponding to various combinations of lengths of the pit to be formed and a land immediately preceding the pit, and various modification amounts for recording-power irradiation end timing of the laser light beam, to start formation of a land, corresponding to various combinations of lengths of the land to be formed and a pit immediately preceding the land; and a control unit that detects, from an input recording signal, combinations of lengths of the pit and the land immediately preceding the pit and lengths of the land and the pit immediately preceding the land, reads out from said storage unit one of the modification amounts for recording-power irradiation start timing or the modification amounts for recording-power irradiation end timing which corresponds to one of the detected combinations, and modifies the recording-power irradiation start timing or the recording-power irradiation end timing relative to predetermined reference timing by an amount corresponding to the read-out modification amount, wherein the modification amounts for recording-power irradiation start timing are set such that, when a first pit of a relatively great length is to be formed, the recording-power irradiation start timing is delayed as compared to when a second pit of a smaller length is to be formed as long as respective lands immediately preceding the first pit of a relatively great length and the second pit of a smaller length have a substantially same length and also that, when a first land of a relatively small length is to be formed, the recording-power irradiation start timing is delayed as compared to when a second land of a greater length is to be formed, and the modification amounts for recording-power irradiation end timing are set such that, when the first land of a relatively small length is to be formed, the recording-power irradiation end timing is advanced as compared to when the second land of a greater length is to be formed as long as respective pits immediately preceding the first land of a relatively small length and the second land of a greater length have a substantially same length and also that, when the first pit of a relatively great length is to be formed, the recording-power irradiation end timing is advanced as compared to when the second pit of a smaller length is to be formed.

12. An optical disk recording device for forming pits and lands based on a mark-length recording scheme by irradiating a laser light beam onto a recording surface of an optical disk, the laser light beam being set to a top power value capable of forming a pit for each pit-forming section and set to a bottom power value incapable of forming the pit for each land-forming section between the pit-forming section, said optical recording device comprising a control unit that, in recording at a speed higher than a normal speed, is capable of:

causing an end timing of a top power irradiation period of the laser light beam to differ from a first predetermined end timing of the pit to be formed by a specific amount depending on a desired length of the pit, or to cause a start timing of the top power irradiation period of the laser light beam to differ from a second predetermined end timing of a land to be formed by a specific amount depending on a desired length of the land; and controlling a forming and imparting of a top-power-increasing additional pulse to a portion of the top power irradiation period to temporarily increase a value of the top power value by a first amount, smaller than a difference between the top power value and the bottom power value, and also to vary a time length of the top-power-increasing additional pulse in accordance with the desired length of the pit, wherein a first energy value of the top-power-increasing additional pulse per time resolution of a control to vary the time length of the top-power-increasing additional pulse, being made smaller than a second energy value of the top power value per time resolution of the control to vary the end timing of the top power value, whereby the control for varying the length of the top-power-increasing additional pulse is capable of adjusting a second amount of an input energy more finely than the control for varying the end timing of the top power value.

13. The optical disk recording device as recited in claim 12 wherein said top-power-increasing additional pulse is set to a same power value for each pit length and is imparted to a beginning of the top power irradiation period of the laser light beam.

14. An optical disk recording device for forming pits and lands based on a mark-length recording scheme by irradiating a laser light beam onto a recording surface of an optical disk, the laser light beam being set to a top power value capable of forming a pit for each pit-forming section and set to a bottom power value incapable of forming the pit for each land-forming section between the pit-forming section, said optical recording device comprising a control unit that, in recording at a speed higher than a normal speed, is capable of:

causing a start timing of a top power irradiation period of the laser light beam to differ from a first predetermined end timing of a land to be formed by a specific amount depending on a desired length of the land or to cause end timing of the top power irradiation period of the laser light beam to differ from a second predetermined end timing of the pit to be formed by a specific amount depending on a desired length of the pit; and controlling a forming and imparting of a bottom-power-off pulse to a portion of the bottom power irradiation period to temporarily decrease a value of the bottom power value by a first amount smaller than a difference between the top power value and the bottom power value and also to vary a time length of the bottom-power-off pulse according to the desired length of the land, wherein a first energy value of the bottom-power-off pulse per time resolution of a control varies the time length of the bottom-power-off pulse, being made smaller than a second energy value of the bottom power value per time resolution of the control to vary the start timing of the top power value, whereby the control to vary the length of the bottom-power-off pulse is capable of adjusting a second amount of an input energy more finely than the control to vary the start timing of the top power value.

15. An optical disk recording device as recited in claim 14 wherein said bottom-power-off pulse is set to a same power value for each land length and is imparted to a beginning of the bottom power irradiation period of the laser light beam.

16. An optical disk recording device for forming pits and lands based on a mark-length recording scheme by irradiating a laser light beam onto a recording surface of an optical disk, the laser light beam being set to a top power value capable of forming a pit for each pit-forming section and set to a bottom power value incapable of forming the pit for each land-forming section between the pit-forming section, said optical recording device comprising a control unit that, in recording at a speed higher than a normal speed, is capable of:

causing an end timing of a top power irradiation period of the laser light beam to differ from a first predetermined end timing of the pit to be formed by a specific amount depending on a desired length of the pit, and causing a start timing of the top power irradiation period of the laser light beam to differ from a second predetermined end timing of a land to be formed by a specific amount depending on a desired length of the land;

controlling a first forming and a first imparting of a top-power-increasing additional pulse to a portion of the top power irradiation period to temporarily increase a value of the top power value by a first amount, smaller than a difference between the top power value and the bottom power value, and also to vary a time length of the top-power-increasing additional pulse according to the desired length of the pit; and controlling a second forming and a second imparting of a bottom-power-off pulse to a portion of a bottom power irradiation period of the laser light beam to temporarily decrease a value of the bottom power value by a second amount, smaller than a difference between the top power value and the bottom power value, and also to vary a time length of the bottom-power-off pulse according to the desired length of the land, wherein a first energy value of the top-power-increasing additional pulse per time resolution of a first control varies the time length of the top-power-increasing additional pulse, being made smaller than a second energy value of the top power value per time resolution of a second control to vary the end timing of the top power value, and a third energy value of the bottom-power-off pulse per time resolution of a third control to vary the time length of the bottom-power-off pulse, being made smaller than a fourth energy value of the bottom power value per time resolution of a fourth control to vary the start timing of the top power value, whereby the first control is capable of adjusting a second amount of an input energy more finely than the second control, and the third control is capable of adjusting a third amount of an input energy more finely than the fourth control.

17. The optical disk recording device as recited in claim 16, wherein said top-power-increasing additional pulse is set to a same power value for each pit length and is imparted to a beginning of the top power irradiation period of the laser light beam.

18. An optical disk recording device as recited in claim 16, wherein said bottom-power-off pulse is set to a same power value for each land length and is imparted to a beginning of the bottom power irradiation period of the laser light beam.

* * * * *